United States Patent
Knepper et al.

(10) Patent No.: US 7,814,105 B2
(45) Date of Patent: Oct. 12, 2010

(54) METHOD FOR DOMAIN IDENTIFICATION OF DOCUMENTS IN A DOCUMENT DATABASE

(75) Inventors: Margaret M. Knepper, Melbourne, FL (US); Kevin Lee Fox, Palm Bay, FL (US); Ophir Frieder, Chicago, IL (US)

(73) Assignee: Harris Corporation, Melbourne, FL (US)

( * ) Notice: Subject to any disclaimer, the term of this patent is extended or adjusted under 35 U.S.C. 154(b) by 322 days.

(21) Appl. No.: 11/381,832

(22) Filed: May 5, 2006

(65) Prior Publication Data

US 2006/0206483 A1 Sep. 14, 2006

Related U.S. Application Data

(63) Continuation-in-part of application No. 10/974,304, filed on Oct. 27, 2004.

(51) Int. Cl.
*G06F 17/30* (2006.01)
(52) U.S. Cl. .................. 707/738; 707/722; 707/728; 707/731; 707/748
(58) Field of Classification Search .................. None
See application file for complete search history.

(56) References Cited

U.S. PATENT DOCUMENTS

| | | | | |
|---|---|---|---|---|
| 4,839,853 A * | 6/1989 | Deerwester et al. | ............... | 1/1 |
| 5,924,105 A * | 7/1999 | Punch et al. | ............... | 715/234 |
| 5,987,457 A * | 11/1999 | Ballard | ............... | 707/5 |
| 5,987,460 A * | 11/1999 | Niwa et al. | ............... | 1/1 |
| 6,035,294 A * | 3/2000 | Fish | ............... | 707/2 |
| 6,076,086 A * | 6/2000 | Masuichi et al. | ............... | 707/3 |
| 6,167,397 A * | 12/2000 | Jacobson et al. | ............... | 707/5 |
| 6,243,724 B1 * | 6/2001 | Mander et al. | ............... | 715/273 |
| 6,496,818 B1 * | 12/2002 | Ponte | ............... | 1/1 |
| 6,499,030 B1 * | 12/2002 | Igata | ............... | 1/1 |
| 6,574,632 B2 | 6/2003 | Fox et al. | ............... | 707/102 |
| 6,671,683 B2 * | 12/2003 | Kanno | ............... | 1/1 |
| 6,701,318 B2 * | 3/2004 | Fox et al. | ............... | 707/706 |
| 6,711,585 B1 * | 3/2004 | Copperman et al. | ............... | 707/104.1 |
| 6,938,046 B2 | 8/2005 | Cooke et al. | ............... | 707/101 |
| 7,003,513 B2 * | 2/2006 | Geiselhart | ............... | 707/5 |
| 7,117,199 B2 * | 10/2006 | Frank et al. | ............... | 707/3 |
| 7,139,756 B2 * | 11/2006 | Cooper et al. | ............... | 707/6 |
| 7,185,008 B2 * | 2/2007 | Kawatani | ............... | 1/1 |
| 7,188,106 B2 * | 3/2007 | Dwork et al. | ............... | 707/5 |
| 7,194,483 B1 * | 3/2007 | Mohan et al. | ............... | 707/104.1 |
| 7,203,679 B2 * | 4/2007 | Agrawal et al. | ............... | 707/6 |
| 7,260,773 B2 * | 8/2007 | Zernik | ............... | 715/229 |
| 7,370,034 B2 * | 5/2008 | Franciosa et al. | ............... | 1/1 |
| 7,451,124 B2 * | 11/2008 | Handley | ............... | 706/45 |
| 7,493,322 B2 * | 2/2009 | Franciosa et al. | ............... | 1/1 |
| 2002/0016787 A1 * | 2/2002 | Kanno | ............... | 707/5 |
| 2002/0069190 A1 * | 6/2002 | Geiselhart | ............... | 707/1 |
| 2003/0065658 A1 * | 4/2003 | Matsubayashi et al. | ............... | 707/4 |

(Continued)

*Primary Examiner*—Apu M Mofiz
*Assistant Examiner*—Hung D Le
(74) *Attorney, Agent, or Firm*—Allen, Dyer, Doppelt, Milbrath & Gilchrist, P.A.

(57) ABSTRACT

A method for processing documents in a document database includes determining vocabulary words for each document, and determining a respective relevancy for each vocabulary word based upon occurrences thereof in all of the documents. Similarities are determined between the documents based upon the vocabulary words and their respective relevancies. At least one domain identification is determined for the documents based upon the determined similarities.

37 Claims, 19 Drawing Sheets

U.S. PATENT DOCUMENTS

| | | | |
|---|---|---|---|
| 2003/0101177 A1* | 5/2003 | Matsubayashi et al. | 707/6 |
| 2003/0154181 A1* | 8/2003 | Liu et al. | 707/1 |
| 2003/0167267 A1* | 9/2003 | Kawatani | 707/6 |
| 2003/0172058 A1* | 9/2003 | Namba | 707/3 |
| 2003/0172066 A1* | 9/2003 | Cooper et al. | 707/7 |
| 2004/0059729 A1 | 3/2004 | Krupin et al. | 707/3 |
| 2004/0128288 A1* | 7/2004 | Cancedda | 707/4 |
| 2005/0010863 A1* | 1/2005 | Zernik | 715/511 |
| 2005/0021508 A1* | 1/2005 | Matsubayashi et al. | 707/3 |
| 2005/0038785 A1* | 2/2005 | Agrawal et al. | 707/6 |
| 2005/0060643 A1* | 3/2005 | Glass et al. | 715/501.1 |
| 2005/0086224 A1* | 4/2005 | Franciosa et al. | 707/6 |
| 2006/0004747 A1* | 1/2006 | Weare | 707/5 |
| 2006/0059143 A1 | 3/2006 | Palmon et al. | 707/5 |
| 2006/0116995 A1* | 6/2006 | Bloedorn | 707/3 |
| 2006/0155751 A1* | 7/2006 | Geshwind et al. | 707/102 |

* cited by examiner

FIG. 9

QUERY RESULTS

SEARCH RESULTS FOR PRIVACY
VOCABULARY USED: PIRACY

AIRE RANKING + MARITIME VOCABULARY RANKING

INFORMATION RETRIEVAL

| VIEW FILE | TITLE | FILE ID | AIRE RELEVANCY | VOCAB RELEVANCY | AIRE+VOCAB RELEVANCY | RELEVANCY | MILDLY RELEVANT | OFF TOPIC | WORD COUNT | COMMENTS |
|---|---|---|---|---|---|---|---|---|---|---|
| | CONCERN EXPRESSED OVER PRC ROLE IN PIRACY | FBIS4-3276 | 6 | 4 | 1 | ✓✓✓✓ | | | 538 | |
| | EDITORIAL CRITICIZES GOVERNMENT HANDLING OF PIRACY ISSUE | FBIS3-3864 | 8 | 6 | 2 | ✓✓✓✓ | | | 354 | |
| | PIRACY ATTACKS IN SOUTHEAST ASIA SHOW DECLINE | FBIS3-48230 | 12 | 3 | 3 | ✓✓✓✓ | | | 245 | |
| | BEIJING TAKES MEASURES ON PIRACY ACTIVITIES | FBIS4-2223 | 15 | 7 | 4 | ✓✓✓✓ | | | 611 | |
| | PIRACY WARNINGS | FT924-15875 | 18 | 16 | 5 | | ✓ | | 764 | |
| | INTERNATIONAL MARITIME ON "PIRACY" BY PRC SHIPS | FBIS4-44900 | 9 | 11 | 6 | ✓ | | | 542 | |
| | WORLD TRADE NEWS: CODED WARNING TO PIRATES - PLANS TO CURB COUNTERFEIT CDS | FT941-774 | 29 | 10 | 7 | | | | 82 | |
| | OFFICIAL URGES FOREIGNERS TO JOIN COPYRIGHT PROTECTION | FBIS4-26215 | 31 | 2 | 8 | ✓✓ | | | 115 | |
| | EASTERN CARIBBEAN ISLANDS BECOMING "PREFERRED AREA" FOR | FBIS4-67139 | 40 | 33 | 9 | | | ✓ | 45 | |
| | BEIJING CALLS "PIRACY" ACTS "JUST," "LAWFUL" | FBIS3-3196 | 11 | 27 | 10 | | | ✓ | 563 | |
| | ASSOCIATION FORMED TO PROTECT IPR | FBIS4-26214 | 19 | 36 | 11 | | | ✓ | 566 | |
| | TOUGHER RESTRICTIONS ON SOFTWARE DUPLICATION HINDERS PIRACY | FT943-17085 | 10 | 8 | 12 | ✓✓ | | | 258 | |
| | COPYRIGHT OFFICIAL VIEWS TPR PROTECTION | FBIS4-26750 | 43 | 35 | 13 | | | ✓ | 746 | |
| | SOFTWARE COMPANIES OFFER REWARDS IN ANTI-PIRACY DRIVE | FBIS4-16684 | 13 | 28 | 14 | | | ✓✓ | 125 | |
| | PRC DENIES SECURITY FORCE PIRACY, DRAWS UP NEW GUIDELINES | FBIS3-3863 | 22 | 9 | 15 | ✓✓ | | | 475 | |
| | TAIWAN BOOSTS COPYRIGHTS | FT922-6363 | 45 | 29 | 16 | | | ✓ | 356 | |
| | INDONESIA DENIES PIRACY LINK IN SHIPS' COLLISION | FT923-1266 | 27 | 12 | 17 | | ✓ | | 457 | |
| | SURVEY OF PERSONAL AND PORTABLE COMPUTERS(21) - TOUGHER TIMES FOR PIRATES/A LOOK AT NETWORKS' HIDDEN BENEFITS | FT931-8281 | 38 | 20 | 18 | | | | 56 | |
| | WORLD TRADE NEWS: US FURY OVER PIRACY BY TAIWANESE | FT932-17442 | 34 | 26 | 19 | | | ✓✓✓ | 785 | |
| | SOFTWARE COMPANIES CRACK DOWN ON THEFT AND PIRACY | FT911-3757 | 52 | 12 | 20 | | | | 235 | |

MARITIME VOCABULARY RANKING

QUERY RESULTS — AIRE | QUERY RESULTS | WORD LIST

SEARCH RESULTS FOR PRIVACY
VOCABULARY USED: PIRACY

INFORMATION RETRIEVAL

| VIEW FILE | TITLE | FILE ID | AIRE RELEVANCY | VOCAB RELEVANCY | AIRE+VOCAB RELEVANCY | RELEVANCY | MILDLY RELEVANT | OFF TOPIC | WORD COUNT | COMMENTS |
|---|---|---|---|---|---|---|---|---|---|---|
| | BEIJING TAKES MEASURES ON PIRACY ACTIVITIES | FBIS4-2223 | 15 | 1 | 4 | ✓ | | | 354 | |
| | MALAYSIA'S DISASTER WARNINGS TO GO UNHEEDED IN STRAIT OF MALACCA: | FT931-13007 | 64 | 2 | 25 | ✓ | | | 562 | |
| | MAERSK NAVIGATOR COLLISION WAS THE LATEST IN A SERIES OF ACCIDENTS | | | | | | | | | |
| | PIRACY ATTACKS IN SOUTHEAST ASIA SHOW DECLINE | FBIS3-48230 | 12 | 3 | 3 | ✓✓ | | | 758 | |
| | INDONESIA DENIES PIRACY LINK IN SHIPS' COLLISION | FBIS3-1266 | 52 | 4 | 17 | ✓✓ | | | 75 | |
| | EDITORIAL CRITICIZES GOVERNMENT HANDLING OF PIRACY ISSUE | FBIS3-3864 | 8 | 5 | 2 | ✓✓ | | | 452 | |
| | INTERNATIONAL MARITIME ON 'PIRACY' BY PRC SHIPS | FBIS3-44900 | 18 | 6 | 6 | ✓✓ | | | 685 | |
| | CONCERN EXPRESSED OVER PRC PIRATE ROLE IN PIRACY | FBIS4-53276 | 2 | 7 | 10 | ✓✓ | | | 245 | |
| | BEIJING CALLS "PIRACY" ACTS 'JUST', 'LAWFUL' | FBIS3-3196 | 40 | 8 | 15 | ✓✓ | | | 658 | |
| | PRC DENIES SECURITY FORCE PIRACY, DRAWS UP NEW GUIDELINES | FBIS3-3863 | 45 | 9 | 5 | ✓✓ | | | 457 | |
| | PIRACY WARNINGS | FBIS4-13875 | 9 | 10 | 51 | | | | 56 | |
| | WORLD TRADE NEWS: US RENEWS PRESSURE ON CHINA OVER INTELLECTUAL PIRACY | FT924-12951 | 88 | 11 | 51 | | ✓✓✓ | | 754 | |
| | EASTERN CARIBBEAN ISLANDS BECOMING 'PREFERRED AREA' FOR PIRACY | FBIS4-67139 | 27 | 12 | 9 | | | ✓ | 114 | |
| | GOVERNMENT CRITICIZED FOR RECEIVING U.S. WARSHIP CREW TOUR | FBIS4-13826 | 78 | 13 | 44 | | | ✓ | 658 | |
| | U.S. "PIRACY" EXAMINED | FBIS4-13578 | 89 | 14 | 53 | | | | 65 | |
| | JOURNAL EXPOSES SHENZHEN PIRATE DISC FACTORY | FBIS3-1847 | 81 | 15 | 48 | | | | 117 | |
| | CHINA TOUTS PROGRESS IN IPR PROTECTION, WARNS AGAINST PIRATES | FBIS4-23127 | 93 | 16 | 56 | | | ✓✓ | 565 | |
| | WORLD TRADE NEWS: CODED WARNING TO PIRATES - PLAN TO CURB COUNTERFEIT CDS | FT941-774 | 17 | 17 | 7 | | | ✓ | 985 | |
| | TAIWAN BOOSTS COPYRIGHTS | FT922-6363 | 36 | 18 | 16 | | | | 658 | |
| | MANAGEMENT (MARKETING AND ADVERTISING): KNIVES OUT FOR PIRATE'S - A NEW YORK COMPANY IS TAKING LEGAL ACTION AGAINST BANGKOK'S COPYCATS | FT944-17861 | 73 | 19 | 45 | | | | 266 | |
| | COPYRIGHT OFFICIAL VIEWS IPR PROTECTION | FBIS4-26750 | 22 | 20 | 13 | | | | 180 | |

62 — AIRE RELEVANCY
66 — VOCAB RELEVANCY
64 — AIRE+VOCAB RELEVANCY
60 — TITLE

1 = AIRE Ranking
2 = AIRE Ranking + Piracy Vocabulary Ranking
3 = AIRE Ranking + Piracy Vocabulary Ranking using identification of irrelevant words
4 = AIRE Ranking + Maritime Vocabulary Ranking using identification of irrelevant words
5 = Maritime vocabulary Ranking using identification of irrelevant words

FIG. 15

| word | feedback R I N U | Used | Docs | WordDoc | RELEVANT | IRRELEVANT | RELEVANCY | USEFULLNESS |
|---|---|---|---|---|---|---|---|---|
| use | ○○○○ | 33 | 11 | 3.00 | 4 | 0 | 1.00 | ✓ |
| sun | ○○○○ | 31 | 3 | 10.33 | 0 | 0 | 0.00 | ✓ |
| power | ○○○○ | 30 | 3 | 10.00 | 0 | 0 | 0.00 | ✓ |
| gene_therapies | ○○○○ | 30 | 3 | 10.00 | 0 | 0 | 0.00 | ✓ |
| one | ○○○○ | 30 | 10 | 3.00 | 7 | 3 | 0.40 | ✓ |
| most | ○○○○ | 30 | 8 | 3.75 | 4 | 0 | 1.00 | ✓ |
| breast_cancer | ○○○○ | 29 | 5 | 5.80 | 25 | 0 | 0.79 | ✓ |
| will | ○○○○ | 29 | 8 | 3.62 | 6 | 1 | 0.71 | ✓ |
| time | ○○○○ | 29 | 8 | 3.62 | 0 | 4 | -0.14 | ✓ |
| bodies | ○○○○ | 28 | 8 | 3.62 | 1 | 1 | 0.00 | ✓ |
| disease | ○○○○ | 27 | 6 | 4.50 | 2 | 0 | 1.00 | ✓ |
| skin_cancer | ○○○○ | 27 | 6 | 4.50 | 0 | 0 | 0.00 | ✓ |
| develop | ○○○○ | 27 | 8 | 3.00 | 14 | 3 | 0.14 | ✓ |
| blood | ○○○○ | 25 | 6 | 4.17 | 4 | 0 | 1.00 | ✓ |
| women | ○○○○ | 25 | 6 | 4.17 | 22 | 3 | 0.76 | ✓ |
| new | ○○○○ | 25 | 9 | 2.78 | 3 | 0 | 1.00 | ✓ |
| year | ○○○○ | 25 | 10 | 2.50 | 4 | 0 | 1.00 | ✓ |
| effect | ○○○○ | 24 | 9 | 2.67 | 4 | 0 | 1.00 | ✓ |

WORD LIST | AIRE | QUERY RESULTS | WORD LIST | INFORMATION RETRIEVAL | HOME

PERFORM RANKING | CHANGE VOCAB PARAMETERS FOR USEFULNESS SETTINGS | TOP WORDS | ALPHABETICAL | RELEVANT | IRRELEVANT | NEW | STATISTICS

WORD LIST FOR PAT_BREASTCANCER
INDEX USED SWEEPSTAKES_INDEX
VOCABULARY USED: CANCER

**Only displaying USEFUL WORDS (go in Vocab Settings to change this feature)

| word feedback | Word | Used | Docs | WordDoc | RELEVANT | IRRELEVANT | RELEVANCY | USEFULLNESS |
|---|---|---|---|---|---|---|---|---|
| R I N U | | 182 | 184 | 186 | 188 | 190 | 192 | |
| ○○○○ | cancer | 184 | 12 | 15.33 | 40 | 7 | 0.70 | ✓ |
| ○○○○ | cell | 69 | 9 | 7.67 | 1 | 0 | 1.00 | ✓ |
| ○○○○ | research | 69 | 11 | 6.27 | 10 | 0 | 1.00 | ✓ |
| ○○○○ | gene | 63 | 5 | 12.60 | 0 | 0 | 0.00 | ✓ |
| ○○○○ | said | 59 | 8 | 7.38 | 14 | 35 | -0.43 | ✓ |
| ○○○○ | studied | 50 | 8 | 6.25 | 8 | 0 | 1.00 | ✓ |
| ○○○○ | skin | 47 | 6 | 7.83 | 41 | 0 | 0.80 | ✓ |
| ○○○○ | breast | 47 | 6 | 7.83 | 10 | 4 | 0.43 | ✓ |
| ○○○○ | not | 45 | 9 | 5.00 | 10 | 1 | 0.88 | ✓ |
| ○○○○ | patient | 41 | 8 | 5.12 | 0 | 0 | 0.00 | ✓ |
| ○○○○ | field | 40 | 2 | 20.00 | 0 | 0 | 0.00 | ✓ |
| ○○○○ | antibodies | 40 | 2 | 20.00 | 0 | 0 | 0.00 | ✓ |
| ○○○○ | therapies | 39 | 3 | 13.00 | 6 | 2 | 0.50 | ✓ |
| ○○○○ | treat | 38 | 6 | 6.33 | 7 | 0 | 1.00 | ✓ |
| ○○○○ | risk | 37 | 7 | 5.29 | 7 | 0 | 1.00 | ✓ |
| ○○○○ | drug | 36 | 5 | 7.20 | 2 | 1 | 0.33 | ✓ |
| ○○○○ | found | 33 | 9 | 3.67 | | | | |
| ○○○○ | use | 33 | 11 | 3.00 | 4 | 0 | 1.00 | ✓ |

Submit

FIG. 16

| word feedback | Word | Used | Docs | WordDoc | RELEVANT | IRRELEVANT | RELEVANCY | USEFULLNESS |
|---|---|---|---|---|---|---|---|---|
| R I N U O O O O | cancer | 184 | 12 | 15.33 | 71 | 2 | 0.95 | ✓ |
| O O O O | cell | 69 | 9 | 7.67 | 12 | 5 | 0.41 | ✓ |
| O O O O | research | 69 | 11 | 6.27 | 26 | 20 | 0.13 | ✓ |
| O O O O | gene | 63 | 5 | 12.60 | 6 | 37 | -0.72 | ✓ |
| O O O O | said | 59 | 8 | 7.38 | 31 | 11 | 0.48 | ✓ |
| O O O O | studied | 50 | 8 | 6.25 | 10 | 5 | 0.33 | ✓ |
| O O O O | skin | 47 | 6 | 7.83 | 46 | 4 | 0.84 | ✓ |
| O O O O | breast | 47 | 6 | 7.83 | 4 | 0 | 1.00 | ✓ |
| O O O O | not | 45 | 9 | 5.00 | 15 | 15 | 0.00 | ✓ |
| O O O O | patient | 41 | 8 | 5.12 | 10 | 22 | -0.30 | ✓ |
| O O O O | field | 40 | 2 | 20.00 | 0 | 0 | 0.00 | ✓ |
| O O O O | antibodies | 40 | 2 | 20.00 | 0 | 0 | 0.00 | ✓ |
| O O O O | therapies | 39 | 3 | 13.00 | 1 | 10 | -0.82 | ✓ |
| O O O O | treat | 38 | 6 | 6.33 | 4 | 21 | -0.68 | ✓ |
| O O O O | risk | 37 | 7 | 5.29 | 14 | 1 | 0.87 | ✓ |
| O O O O | drug | 36 | 5 | 7.20 | 5 | 4 | 0.11 | ✓ |
| O O O O | found | 33 | 9 | 3.67 | 13 | 0 | 0.24 | ✓ |
| O O O O | use | 33 | 11 | 3.00 | 11 | 5 | 0.38 | ✓ |

SKIN CANCER

FIG. 17

| WORD LIST | AIRE | QUERY RESULTS | WORD LIST | | INFORMATION RETRIEVAL | HOME |
|---|---|---|---|---|---|---|

PERFORM RANKING | CHANGE VOCAB PARAMETERS FOR USEFULNESS SETTINGS | TOP WORDS | ALPHABETICAL | RELEVANT | IRRELEVANT | NEW | STATISTICS

WORD LIST FOR PAT_BRAINCANCER
INDEX USED SWEEPSTAKES_INDEX
VOCABULARY USED: CANCER

**Only displaying USEFUL WORDS (go in Vocab Settings to change this feature)

| word feedback | Word 181 | Used | Docs 184 | WordDoc 186 | RELEVANT 188 | IRRELEVANT 190 | RELEVANCY 192 | USEFULNESS |
|---|---|---|---|---|---|---|---|---|
| R I N | | | | | | | | |
| O O O | cancer | 184 | 12 | 15.33 | 59 | 0 | 1.00 | ✓ |
| O O O | cell | 69 | 9 | 7.67 | 34 | 5 | 0.74 | ✓ |
| O O O | research | 69 | 11 | 6.27 | 33 | 8 | 0.61 | ✓ |
| O O O | gene | 63 | 5 | 12.60 | 40 | 27 | 0.19 | ✓ |
| O O O | said | 59 | 8 | 7.38 | 13 | 0 | 1.00 | ✓ |
| O O O | studied | 50 | 8 | 6.25 | 31 | 32 | -0.02 | ✓ |
| O O O | skin | 47 | 6 | 7.83 | 1 | 0 | 1.00 | ✓ |
| O O O | breast | 47 | 6 | 7.83 | 3 | 0 | 1.00 | ✓ |
| O O O | not | 45 | 9 | 5.00 | 20 | 7 | 0.48 | ✓ |
| O O O | patient | 41 | 8 | 5.12 | 12 | 4 | 0.50 | ✓ |
| O O O | field | 40 | 2 | 20.00 | 40 | 4 | 0.82 | ✓ |
| O O O | antibodies | 40 | 2 | 20.00 | 35 | 1 | 0.94 | ✓ |
| O O O | therapies | 39 | 3 | 13.00 | 37 | 0 | 0.85 | ✓ |
| O O O | treat | 38 | 6 | 6.33 | 19 | 3 | 0.73 | ✓ |
| O O O | risk | 37 | 7 | 5.29 | 18 | 2 | 0.70 | ✓ |
| O O O | drug | 36 | 5 | 7.20 | 23 | 0 | 1.00 | ✓ |
| O O O | found | 33 | 9 | 3.67 | 15 | 5 | 0.50 | ✓ |
| O O O | use | 33 | 11 | 3.00 | 11 | 1 | 0.03 | ✓ |

Submit

BRAIN CANCER

*FIG. 18*

METHOD FOR DOMAIN IDENTIFICATION OF DOCUMENTS IN A DOCUMENT DATABASE

RELATED APPLICATION

This application is a continuation-in-part of U.S. patent application Ser. No. 10/974,304 filed Oct. 27, 2004, the entire contents of which are incorporated herein by reference.

FIELD OF THE INVENTION

The present invention relates to the field of information retrieval, and more particularly, to a method of categorizing documents in a document database.

BACKGROUND OF THE INVENTION

Information retrieval systems and associated methods search and retrieve information in response to user search queries. As a result of any given search, vast amounts of data may be retrieved. These data may include structured and unstructured data, free text, tagged data, metadata, audio imagery, and motion imagery (video), for example. To compound the problem, information retrieval systems are searching larger volumes of information every year. A study conducted by the University of California at Berkley concluded that the production of new information has nearly doubled between 1999 and 2002.

When an information retrieval system performs a search in response to a user search query, the user may be overwhelmed with the results. For example, a typical search provides the user with hundreds and even thousands of items. The retrieved information includes both relevant and irrelevant information. The user now has the burden of determining the relevant information from the irrelevant information.

One approach to this problem is to build a taxonomy. A taxonomy is an orderly classification scheme of dividing a broad topic into a number of predefined categories, with the categories being divided into sub-categories. This allows a user to navigate through the available data to find relevant information while at the same time limiting the documents to be searched. However, creating a taxonomy and identifying the documents with the correct classification is very time consuming. Moreover, a taxonomy requires continued maintenance to categorize new information as it becomes available U.S. Pat. No. 6,938,046 discloses a taxonomy that includes polyarchical coding, which involves using multiple higher level codes applied to the same lower level code. The polyarchical coding means that, for example, a coder need only enter one lower level code for a piece of data and the higher level polyarchical codes are automatically applied.

Another approach is to use an information retrieval system that groups the results to assist the user. For example, the Vivisimo Clustering Engine™ made by Vivisimo, Inc. of Pittsburg, Pa., automatically organizes search results into meaningful hierarchical folders on-the-fly. As the information is retrieved, it is clustered into categories that are intelligently selected from the words and phrases contained in the search results themselves. In particular, the Vivisimo Clustering Engine™ uses only the returned title and abstract for each result. The similarity between documents is based on this raw material (i.e., the visible text of the search result and not the entire article) and nothing else. The documents are then clustered together based on textual similarity. However, this raw similarity is augmented with human knowledge of what users wish to see when they examine clustered documents. This results in the categories being up-to-date and fresh as the contents therein Visual navigational search approaches are provided in U.S. Pat. Nos. 6,574,632 and 6,701,318 to Fox et al., the contents of which are hereby incorporated herein by reference. Fox et al. discloses an information retrieval and visualization system utilizing multiple search engines for retrieving documents from a document database based upon user input queries. Each search engine produces a common mathematical representation of each retrieved document. The retrieved documents are then combined and ranked. A mathematical representation for each respective document is mapped onto a display. Information displayed includes a three-dimensional display of keywords from the user input query. The three-dimensional visualization capability based upon the mathematical representation of information within the information retrieval and visualization system provides users with an intuitive understanding, with relevance feedback/query refinement techniques that can be better utilized, resulting in higher retrieval accuracy.

Despite the continuing development of search engines and result visualization techniques, there is still a need to quickly and efficiently group together similar documents in a document database to present search results to the user in a meaningful manner.

SUMMARY OF THE INVENTION

In view of the foregoing background, it is therefore an object of the present invention to assist a user in categorizing documents in a document database.

This and other objects, features, and advantages in accordance with the present invention are provided by a method for processing a plurality of documents in a document database comprising determining vocabulary words for each document of the plurality thereof, and determining a respective relevancy for each vocabulary word based upon occurrences thereof in the plurality of documents. The method further comprises determining similarities between the plurality of documents based upon the vocabulary words and their respective relevancies. At least one domain identification is determined for documents based upon the determined similarities.

Determining similarities between the plurality of documents may comprise selecting a portion of the vocabulary words based on their respective relevancies for defining a superset of vocabulary words, with the superset of vocabulary words illustrating similarities between the plurality of documents and having an overall domain identification associated therewith.

The method may further comprise dividing the overall domain identification into lower level domain identifications based upon selecting vocabulary words associated with each respective lower level domain identification. As a result, the relevancies of vocabulary words associated with each lower level domain identification changes so that similar documents are grouped together for each lower level domain identification.

Determining the respective relevancies of the vocabulary words may comprise counting how many times each vocabulary word is used in the plurality of documents, and counting how many of the plurality of documents uses each of the vocabulary words. The method may further comprise generating a word/document ratio for each respective vocabulary word based upon the counting, and if the word/document ratio is less than a threshold, then the relevancy of the word is not used when determining similarities between the plurality of documents. Alternatively, the method may comprise permitting user setting of the respective relevancy of at least one of the vocabulary words. The respective relevancies for each vocabulary word may be further based upon a relevancy feedback factor. The relevancy feedback factor may be based upon a user search query or an algorithm, for example Similarities between the documents may be determined based on identifying patterns of words in the vocabulary words. The pattern of words may comprise n-word phrases, where $n \geq 2$, for example. In other words, the domain identification for similar documents may be determined by a computer based upon overlapping vocabulary words.

In addition, the method may further comprise determining vocabulary words corresponding to a predetermined domain identification. Similarities may be determined between the vocabulary words for the plurality of documents and the vocabulary words corresponding to the predetermined domain identification. The predetermined domain identification may then be assigned to at least one of the documents based on the determined similarities.

The documents may comprise web site documents, electronic mail messages, and non-text documents having metadata associated therewith. The non-text documents may comprise video image files, photograph files, and audio files.

Another aspect of the invention is directed to a computer-readable medium having computer-executable instructions for causing a computer to process documents in a document database as defined above.

Yet another aspect of the invention is directed to a computer-implemented system for processing documents in a document database as defined above.

BRIEF DESCRIPTION OF THE DRAWINGS

FIGS. 8-11 are display screens illustrating the document rankings for different ranking parameters in accordance with the present invention

FIGS. 15-19 are display screens illustrating vocabulary words from documents in a document database used to categorize the documents in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
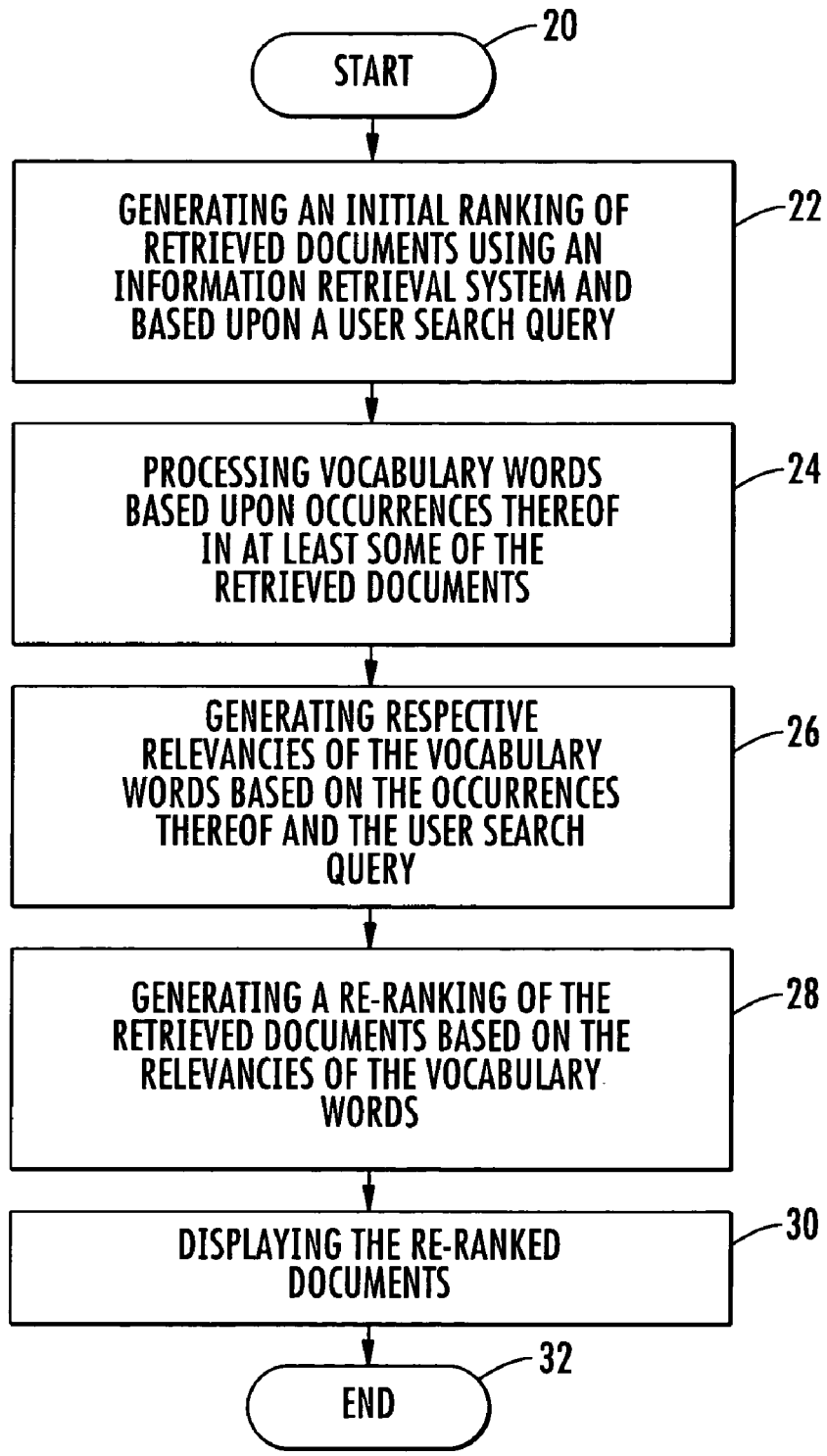
FIG. 1 is a flowchart for processing documents in a document database in accordance with the present invention.

Referring initially to FIG. 1, the present invention is directed to a computer-implemented method for processing documents in a document database. From the start (Block 20), the method comprises generating an initial ranking of retrieved documents using an information retrieval system and based upon a user search query at Block 22. A plurality of vocabulary words based upon occurrences thereof in at least some of the retrieved documents is generated at Block 24, and respective relevancies of the vocabulary words based on the occurrences thereof and the user search query is generated at Block 26. A re-ranking of the retrieved documents based on the relevancies of the vocabulary words is generated at Block 28. The method further comprises displaying the retrieved documents after having been re-ranked at Block 30. The method ends at Block 32.

The computer-implemented method for processing documents in a document database advantageously allows a user to identify relevant documents and discard irrelevant documents after the documents have been retrieved using an information retrieval system. The user may be a human user or a computer-implemented user. When the user is computer-implemented, identifying relevant documents and discarding irrelevant documents is autonomous. The information retrieval system includes an input interface for receiving the user search query, and a search engine for selectively retrieving documents from a document database.

The search engine is not limited to any particular search engine. An example search engine is the Advanced Information Retrieval Engine (AIRE) developed at the Information Retrieval Laboratory of the Illinois Institute of Technology (IIT). AIRE is a portable information retrieval engine written in Java, and provides a foundation for exploring new information retrieval techniques. AIRE is regularly used in the Text Retrieval Conference (TREC) held each year, which is a workshop series that encourages research in information retrieval from large text applications by providing a large text collection, uniform scoring procedures, and a forum for organizations interested in comparing their results.

Since TREC uses a dataset with known results, this facilities evaluation of the present invention. An example search topic from TREC is "piracy," which is used for illustrating and evaluating the present invention. AIRE provides the initial ranking of the retrieved documents based upon the "piracy" user search query. The number and/or order of the relevant documents in the initial ranking is the baseline or reference that will be compared to the number of relevant documents in the re-ranked documents.

As will be discussed in further detail below, there are a variety of word and document relevancy options available to the user. Individually or in combination, these options improve the retrieval accuracy of a user search query. Implementation of the present invention is in the form of an algorithm requiring user input, and this input is provided via the graphical user interface (GUI) associated with AIRE.

Figure 2:
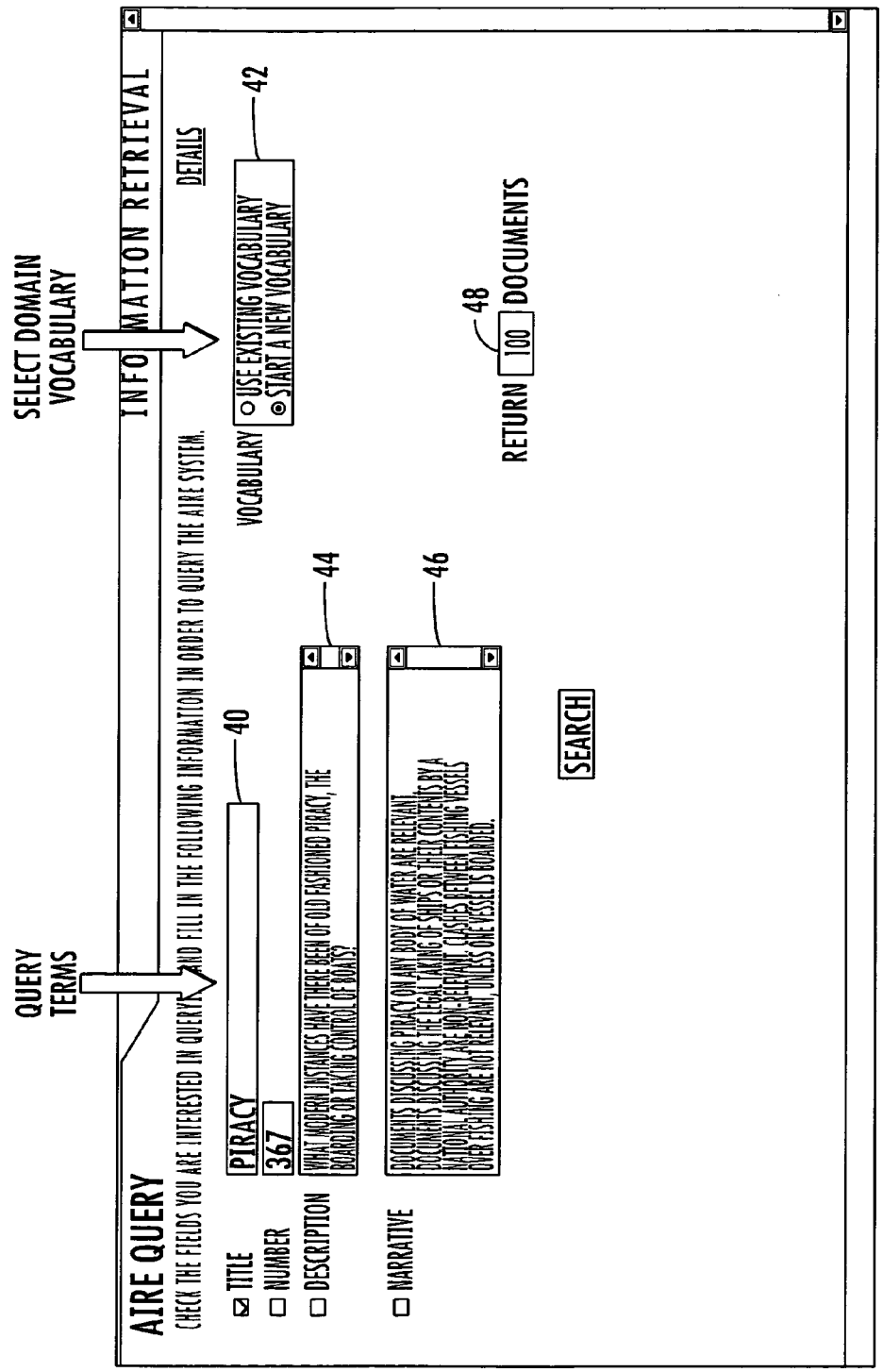
FIG. 2 is an initial query display screen in accordance with the present invention.

The initial AIRE query screen for assisting a user for providing the relevant feedback for re-ranking the retrieved documents is provided in FIG. 2. The "piracy" user search query is provided in section 40, and the user has the option in section 42 of starting a new vocabulary or using an existing vocabulary. In this case, a new vocabulary is being started.

A description of the topic of interest is provided in section 44, which is directed to "what modern instances have there been of good old-fashioned piracy, the boarding or taking control of boats?" A narrative providing more detailed information about the description is provided in section 46. The narrative in this case states that "documents discussing piracy on any body of water are relevant, documents discussing the legal taking of ships or their contents by a national authority are non-relevant, and clashes between fishing boats over fishing are not relevant unless one vessel is boarded." The words in the description and narrative sections 44, 46 were not included as part of the user search query. Nonetheless, the user has the option of making the words in the description and narrative sections 44, 46 part of the user search query by selecting these sections along with section 40.

Figure 3B:
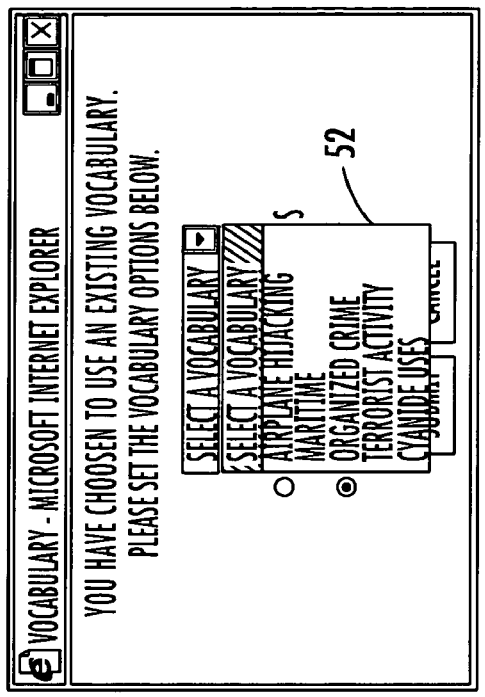
FIGS. 3a and 3b respectively illustrate in accordance with the present invention a display screen for starting a new vocabulary and for using an existing vocabulary.
Figure 3A:
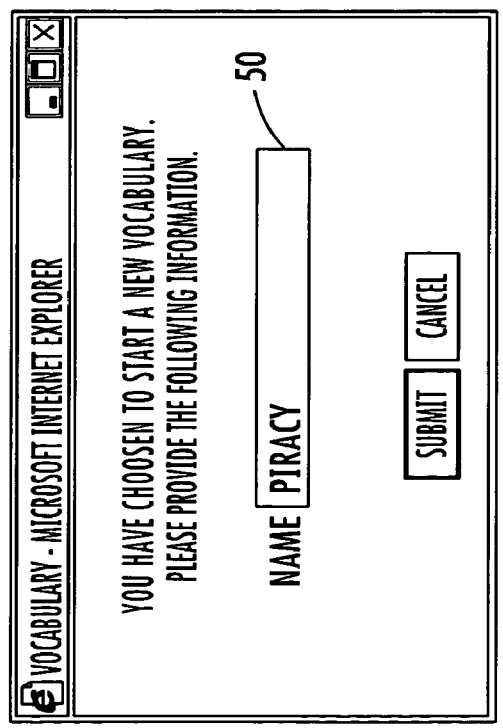

When the user selects starting a new vocabulary in section 42, a new vocabulary screen appears as illustrated in FIG. 3a. Here the user enters a name for the new vocabulary in section 50, which in the illustrated example is "piracy." In this case, the title of the new vocabulary is also the user search query. Alternatively, if the user had selected using an existing vocabulary in section 42, then the existing vocabulary screen appears as illustrated in FIG. 3b. A topic of interest may overlap two different vocabularies so selecting a preferred vocabulary would be helpful. As in the illustrated example, piracy relates to maritime instead of the illegal coping of movies and songs. Consequently, an existing vocabulary, such as "maritime" may be selected in section 52, which already includes relevant words that would be found in the retrieved documents. In fact, the vocabulary words in the existing vocabularies may be taken from the words in preferred documents that are known to be relevant to the user search query. The preferred document may or may not be part of the retrieved documents.

The initial ranking of the retrieved documents is a very large number with respect to "piracy," which includes both relevant and irrelevant documents. Before generating a new vocabulary, the user selects the N top ranked documents in section 48 in FIG. 2. In the illustrated example, the number of top ranked documents to be re-ranked is 100.

To build a new vocabulary, an algorithm counts the number of times words are used throughout the top 100 retrieved documents. The words may be counted at their stemmed version, although this is not absolutely necessary. A domain vocabulary can also be built by providing a list of relevant documents. The information collected for each word in each document is the number of times the word was used in the document, and the number of documents in the top 100 top ranked documents that used the word.

Next, document statistics are calculated for determining how useful each word is to the N top ranked documents. Useless words are not used to calculate information about the document. Useless words are words that do not provide meaning, such as stop words (e.g., am, are, we) or words that act as stop words within the domain (e.g., computer in computer science literature). Statistics used for determining a useless word may include, but are not limited to, the following:

a) word/document ratio=1 (the word needs to appear more than once in a document to be useful);

b) word/document ratio>20 (this determines a meaningful threshold; and a range of thresholds may be used instead of a single threshold); and c) the number of documents=1 (the word needs to appear in more than one document).

Based upon the criteria in a) through c), the vocabulary thus comprises for each useful word the number of times it was used (traditional term frequency only within a single document, the number of documents using the word (traditional document frequency), and the word/document ratio.

After a list of vocabulary words provided by the top 100 ranked documents and the user search query (i.e., "piracy") has been compiled, the relevancy of the vocabulary words are set. Some vocabulary words may be more relevant/irrelevant than other words. Word relevance is set by topic, which in this case is "piracy" as related to "maritime." Relevant words are useful words that describe the topic "piracy." Irrelevant words are words that do not describe the topic, and are an indicator of irrelevant documents.

Relevance is set to a value of 1 for the query terms supplied by the user. The relevance value of a vocabulary word is based upon the number of times the word was relevant and on the number of times the word was irrelevant. The relevancy value of a word can be written as follows: Relevancy Value=(#Rel−#Irrel)/(#Rel+#Irrel). A word can be deemed relevant, for example, if the relevancy value>0.5, and irrelevant if the relevancy value<−0.5. The 0.5 and −0.5 are example values and may be set to other values as readily appreciated by those skilled in the art. In addition, a range of thresholds may be used instead of a single threshold.

To calculate document statistics, information is calculated based on the words in the N top ranked documents. A document comprises a set of words, and a word can appear 1 or more times therein. Each document is essentially unstructured text, and a word can be characterized as new, useless or useful. A new word is new to the vocabulary. In a training session, i.e., starting with a new vocabulary, all the words are in the vocabulary. A useless word is not used in document calculations, and as noted above, these words do not provide meaning. Useless words are stop words, such as am, are, we, or words that act as stop words within the domain, such as computer in computer science literature. A useful word is a word that will be used in the document statistics.

A useful word can be further classified as relevant, irrelevant or neutral. As defined by these classification terms, a relevant word is important to the topic, and an irrelevant word is not useful to the topic and is usually an indicator of a bad document. A neutral word is one in which the status of the word as related to the topic has not been determined.

To calculate the re-ranking of the retrieved documents, an algorithmic approach is used to rate the documents. The algorithmic approach uses the relevancy information discussed above. The output of the initial document ranking by AIRE is a list of the documents rated from 1 to 100, where 100 was selected by the user. The lowest number indicates the best ranking. Alternatively, the highest number could be the best ranking.

Three different relevancy values are used to re-rank the documents. The first relevancy value is based upon following expression:

$$\text{Unique Rel} - \text{Unique Irrel} \rightarrow \text{UniqueRel} \tag{1}$$

The number of unique relevant words in the document is counted, and the number of irrelevant words in the document is counted. The sum of the irrelevant words is subtracted from the sum of the relevant words. As an observation, this calculation becomes more useful when there are only individual words identified. That is, entire documents have not been identified as relevant/irrelevant.

The second relevancy value is based upon following expression:

$$\text{Rel NO Freq} - \text{Irrel NO Freq} \rightarrow \text{RelNOFreq} \quad (2)$$

Here the importance of unique relevant/irrelevant words in the document is determined. The sum of the number of times the word is irrelevant in the vocabulary is subtracted from the sum of the number of times the word is relevant in the vocabulary. A word that appears more often in the vocabulary will have a higher weight than words that just appeared a couple of times. As an observation, this value is tightly coupled with the Unique Rel−Irrel value in expression (1), particularly when all the values are positive.

The third relevancy value is based upon following expression:

$$\text{Rel Freq} - \text{Ir Freq} \rightarrow \text{RelFreq} \quad (3)$$

Here the importance of unique relevant/irrelevant words and their frequency in the documents is determined. The sum of the number of times the word is relevant in the vocabulary is multiplied by the number of times the word is used in the document. The sum of the number of times the word is irrelevant in the vocabulary is multiplied by the number of times the word is used in the document. The irrelevancy frequency sum is subtracted from the relevancy frequency sum. A word that appears more often in the vocabulary will have a higher weight than words that just appeared a couple of times. As an observation, this value is more useful when relevant/irrelevant document examples have been trained in the system.

To identify bad documents there are two techniques. One is based upon the over usage of specific words, and the other is based on a low UniqueRel value as defined in expression (1). With respect to over usage of specific words, documents that have a word appearing more than 100 times, for example, in a document are identified as bad documents. Also, words that are used very frequently in a few documents are determined to have a usefulness set to 0. The user has the option of setting the number of times the word appearing in a document is to be considered as a bad value.

The initial ranking of the N top ranked retrieved documents is re-ranked from the highest relevancy values to the lowest relevancy values for expressions 1) UniqueRel, 2) RelNOFreq and 3) RelFreq. The re-ranking of each document is averaged for the three expressions to obtain the final re-ranking of the retrieved documents. In each of the respective document rankings, bad documents are sent to the bottom of the document list. Two different techniques may be used in moving the bad documents to the bottom. One technique is jumping number ordering—which assigns large values to the document's ranking so that it remains at the bottom. The other technique is smooth number ordering—which assigns continuous ranking numbers to the documents.

With respect to the UniqueRel numbers obtained for the documents, all documents with the smallest UniqueRel number are identified as bad. If the second smallest UniqueRel numbers are under 30%, for example, then these documents are also characterized as bad. Additional small UniqueRel documents can be added until the total number of documents does not exceed 30%. In other words, taking the percentage of the lowest number of UniqueRel from the percentage of the highest number of UniqueRel should not exceed 30%. The user has the option of setting this threshold to a value other than 30%, as readily appreciated by those skilled in the art.

In re-ranking the N top ranked retrieved documents, it is also possible to assign priority to a document based upon the source of the document. For example, National Scientific would carry a greater weight than The National Enquirer.

Management of the data will now be discussed with reference to the user display screens provided in FIGS. 4-7. The data are handled at two levels: vocabulary and topic. The vocabulary is used to define the domain, and includes for each word the number of times used in each document and the number of documents the word appeared. A vocabulary can be used by multiple topics, such as in the form of a predefined vocabulary. However, it is preferable to avoid using the same document to train multiple times. With respect to the managing the data by topic, the relevance/irrelevance of the words and documents are used, as well as using the query search terms.

Figure 4:
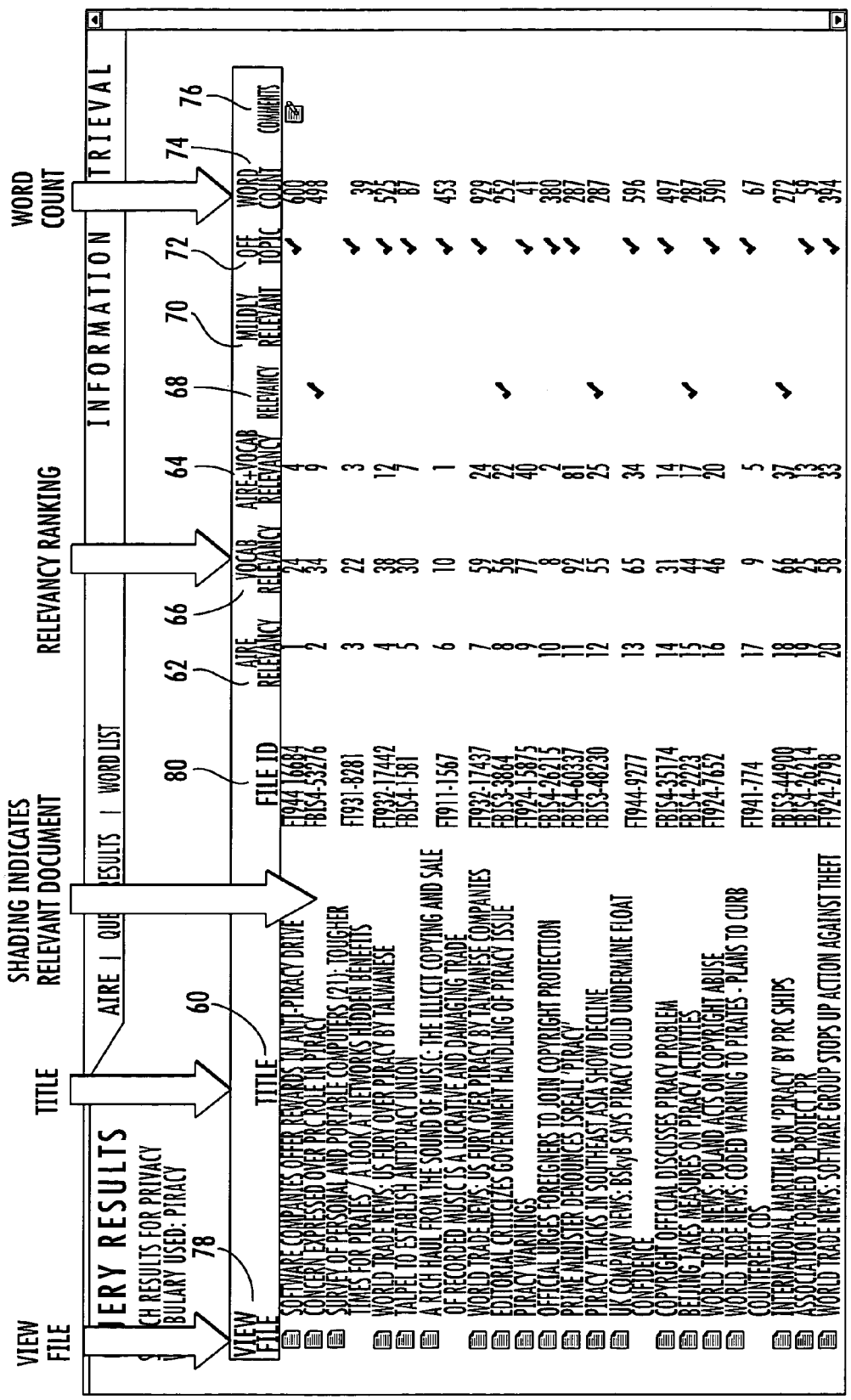
FIG. 4 is a display screen illustrating the query results using the "piracy" vocabulary in accordance with the present invention.

The majority of the data management deals with the user interface. The user has the ability to view any document and the word information associated therewith. The user has the ability to identify relevant/irrelevant documents and words to use for training, i.e., building the vocabulary. The user has the ability to identify words for a future AIRE query. The user has the ability to run a new AIRE query or re-run the ranking algorithm in accordance with the present invention on the current data based on information supplied to the system The initial ranking of the retrieved documents using the "piracy" vocabulary is illustrated in FIG. 4. Column 60 lists the titles of the documents in order from high to low. The AIRE relevancy is provided in column 62. After the retrieved documents have been re-ranked while taking into account the "piracy" vocabulary, this re-ranking is averaged with the initial ranking provided by AIRE in column 62. The combination of the two rankings is provided in column 64. For example, the highest ranked document in column 62 is now the sixth ranked document in column 64.

Selecting any one of the listed titles in column 60 will display the document words. The relevancy of each vocabulary word with respect to each document is provided in column 66. For each document, the document may be marked as relevant (column 68), mildly relevant (column 70) or off topic (column 72). In addition, the total word count for each document is provided in column 74, and comments associated with any of the documents may be added or viewed by selecting the icon in column 76.

If the user desires to view the entire document, then the user highlights the icon in column 78 next to the title of interest. The information for each document is stored in a respective file, as indicated by column 80. To further assist the user, when a document is marked as relevant, then the row associated with the relevant document is highlighted.

Figure 5:
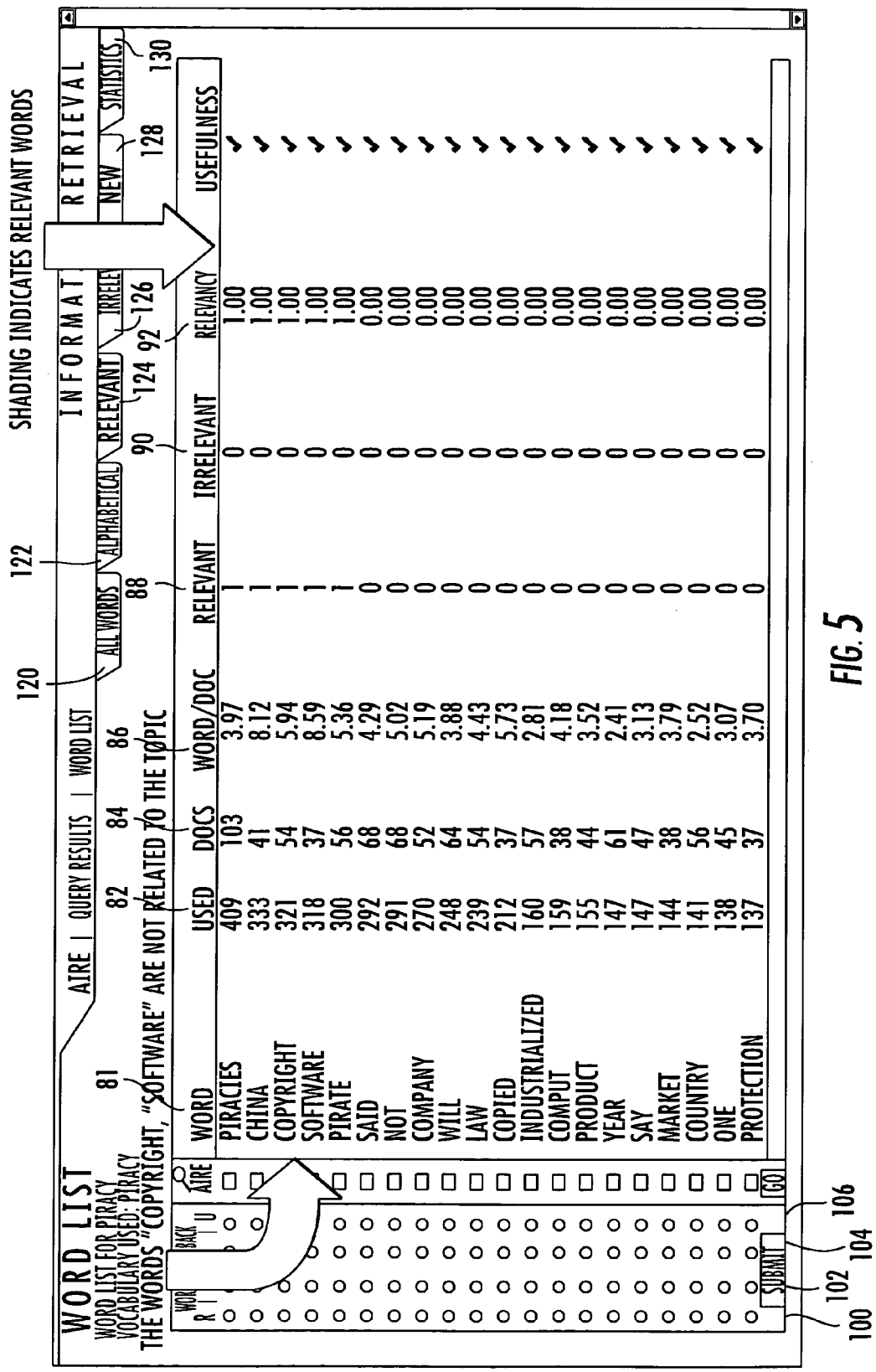
FIGS. 5 and 6 are display screens illustrating the word lists from a selected document in accordance with the present invention.

By selecting on the title of a particular document in column 60, the words in that document are displayed in column 81 in an order based upon how many times they are used in the document (FIG. 5). This screen also shows how the words are set in terms of relevancy. The number of times each vocabulary word is used in the document is listed in column 82, and the number of documents that uses the word is listed in column 84. The word/document ratio is provided in column 86. The vocabulary words initially marked by the user as relevant are indicated by the numeral 1 in columns 88 and 92. If the vocabulary word is irrelevant, then the numeral −1 is placed instead in column 90.

The highlighted section in FIG. 5 also indicates the relevant words. However, the words "copyright" and "software" are not related to the topic "piracy." While still in this screen, the user can sort the words by relevancy and usage by selecting the appropriate characterization: R for relevant (column 100), I for irrelevant (column 102), N for neutral (column 104) and U for useless (column 106). If the word is already marked as relevant, then no action is required for that word.

Figure 6:
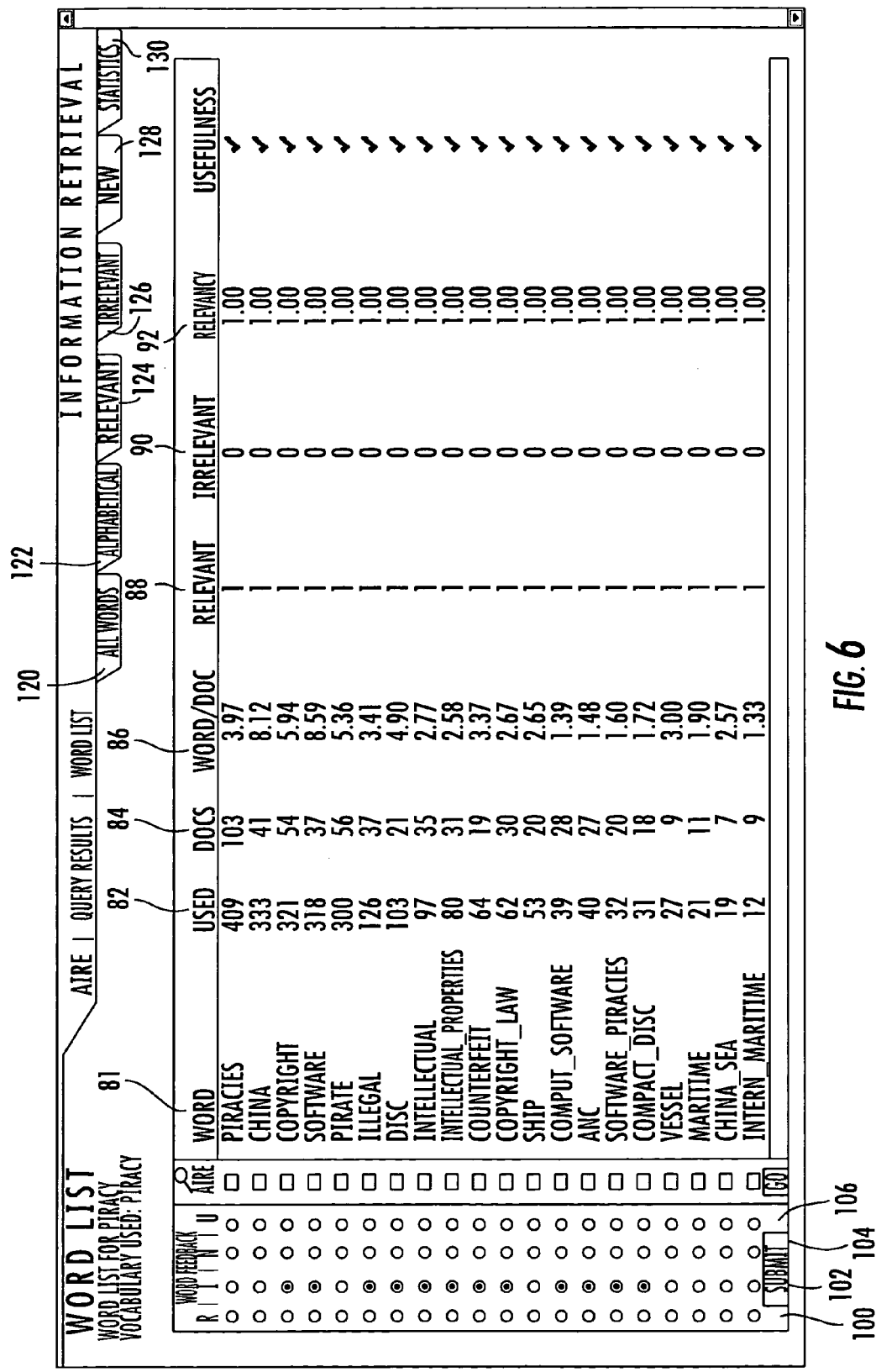

The screen display illustrated in FIG. 6 illustrates the selection of certain vocabulary words via column 102 as irrelevant. An alternative to the display screen in FIGS. 5 and 6 when viewing the words in a particular document is provided in FIG. 7. In this particular screen, the user also has the option of selecting in section 110' whether the document is relevant, mildly relevant or off topic. The user also has the option of adding new words via section 112' to the vocabulary.

Figure 7:
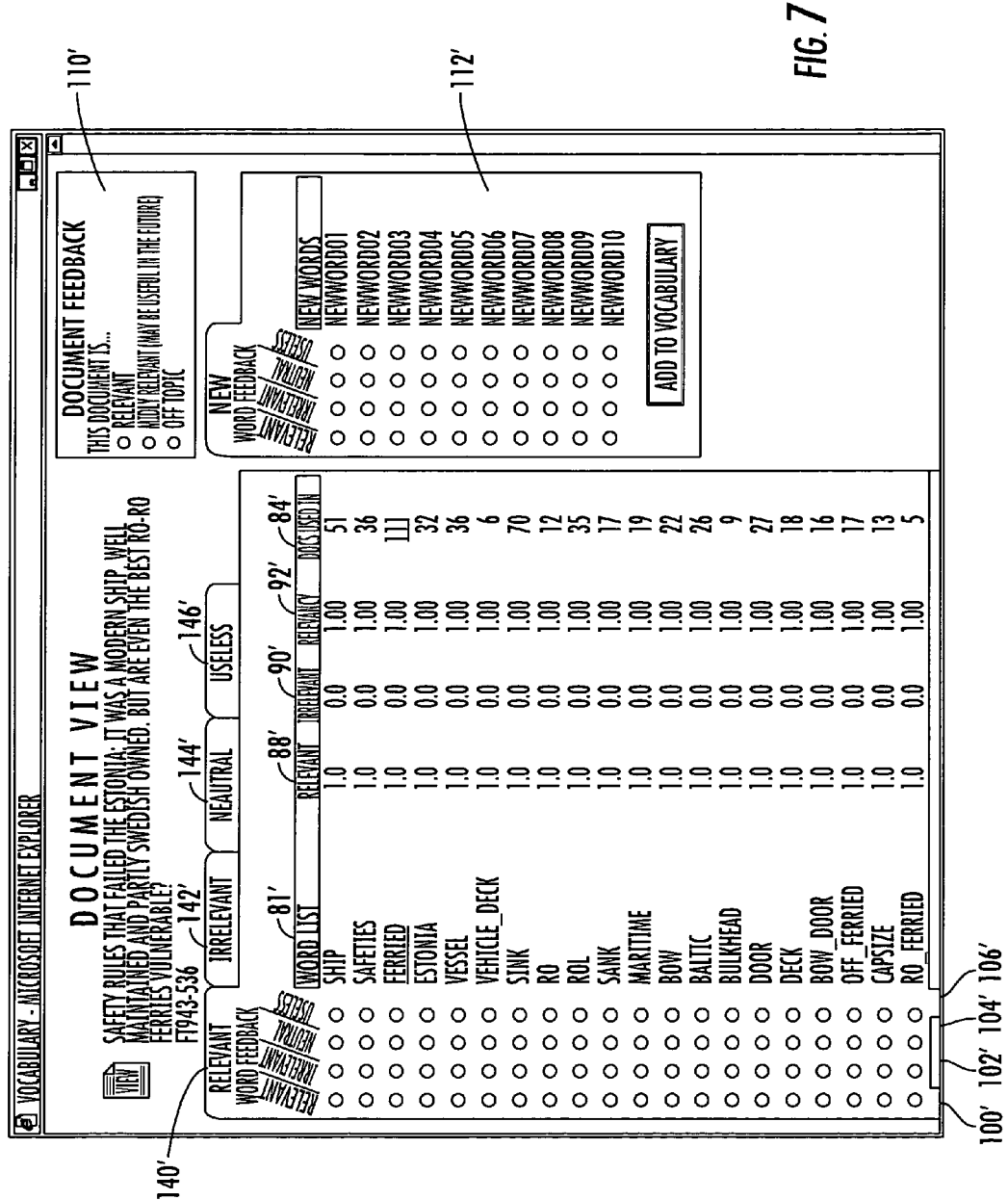
FIG. 7 is a display screen illustrating another version of a word list from a selected document in accordance with the present invention.

The user also has the option of selecting multiple views (as labeled) according to user preference. For instance, tab 120 list all the vocabulary words in a document, tab 122 list the vocabulary words in alphabetical order, tab 124 list the vocabulary words marked as relevant, tab 126 list the vocabulary words marked as irrelevant, tab 128 list the vocabulary words marked as new, and statistics of the vocabulary words may be obtained by selecting tab 130. In FIG. 7, the user has the option of selecting tabs with respect to the relevant/irrelevant/neutral words in the documents. Tab 140' list the relevant words in the documents, tab 142' lists the irrelevant words in the documents, tab 144' list the neutral words in the documents, and tab 146' list the useless words in the documents.

Figure 8:
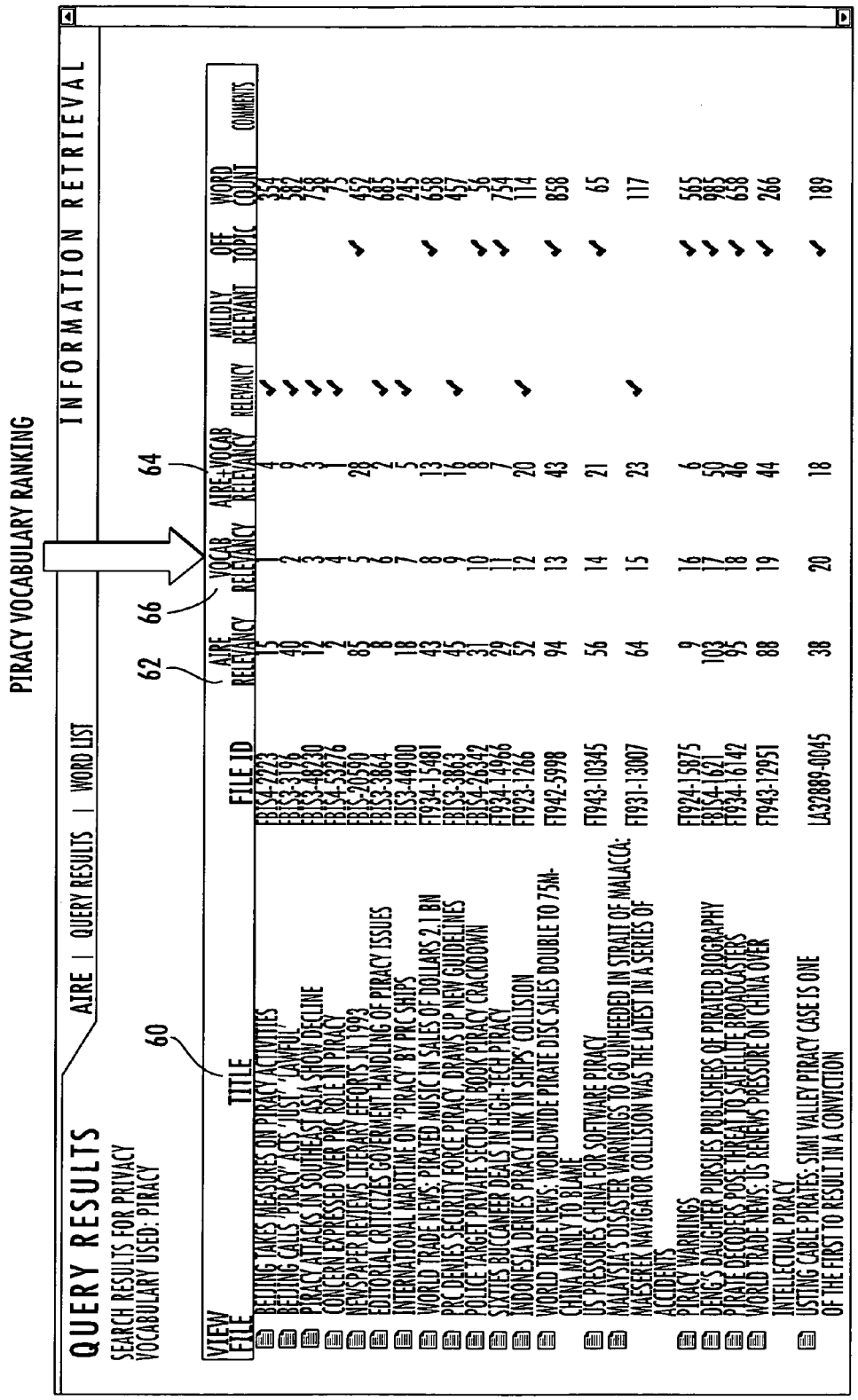
Figure 9:
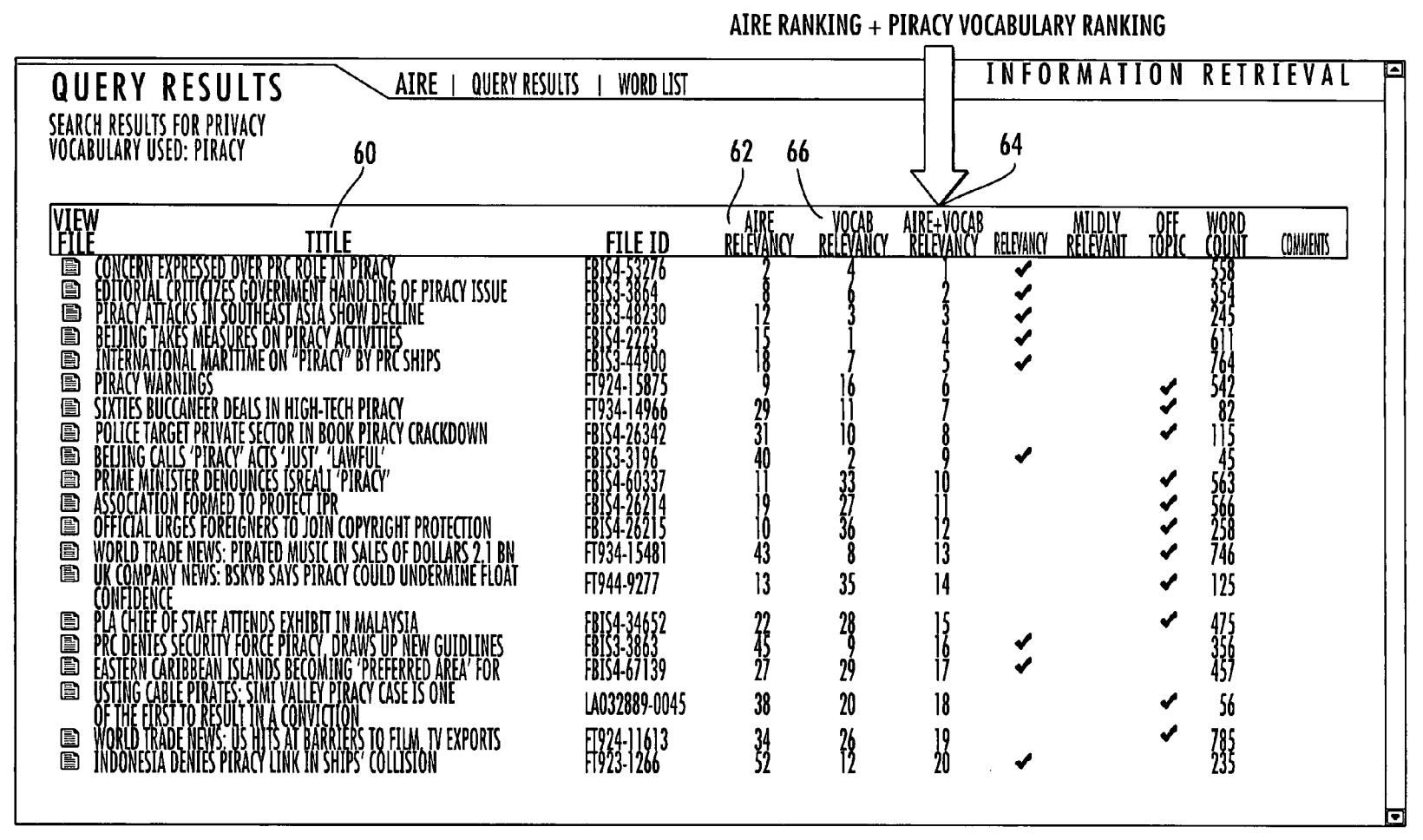

Comparing various document ranking results of the computer-implemented method for processing documents in a document database in accordance with the present invention will now be compared to the baseline results provided by AIRE, that is, the initial ranking of the retrieved documents. The display screens provided in FIGS. 4 and 8-11 will now be referenced. The initial ranking from 1 to 20 (column 62) of the retrieved documents is provided in column 60 as shown in FIG. 4. The document titles corresponding to the "piracy" vocabulary rankings from 1 to 20 (column 66) are listed in column 60 in FIG. 8. A visual comparison can be made between the relationships in the ranked baseline documents versus the ranked documents provided by the most relevant "piracy" vocabulary words Combining the AIRE ranking and the "piracy" vocabulary ranking to obtain a new ranking from 1 to 20 (column 64) is provided in column 60 in FIG. 9. In lieu of creating a new vocabulary as discussed above, an existing vocabulary may be used. For example, the results of a predefined "maritime" vocabulary have now been combined with the AIRE results. The documents ranked from 1 to 20 (column 64) corresponding to this re-ranking are listed in column 60 in FIG. 10. As yet another comparison, the document titles corresponding to only the "maritime" vocabulary rankings from 1 to 20 (column 66) are listed in column 60 in FIG. 11. A visual comparison can again be made between the relationships in the ranked baseline documents provided by AIRE in FIG. 4 versus the ranked documents provided by the most relevant "maritime" vocabulary words in FIG. 11.

The results of the various approaches just discussed for re-ranking the retrieved documents will now be discussed with reference to FIG. 12. This discussion is based upon the number of relevant documents in the top 5, 10, 15, 20 and 30 ranked or re-ranked documents. The first set of bar graphs correspond to the baseline AIRE rankings provided in columns 60 and 62 in FIG. 4. In the 5 top ranked documents there was 1 relevant document; in the 10 top ranked documents there were 2 relevant documents; in the 15 top ranked documents there were 4 relevant documents; in the 20 top ranked documents there were 5 relevant documents, and in the 30 top ranked documents there were 6 relevant documents When the AIRS ranking was combined with the "piracy" vocabulary ranking as provided in columns 60, 64 in FIG. 9 there was a decrease in the number of relevant documents in the re-ranked documents, as illustrated by the second set of bar graphs. In contrast, the number of relevant documents increases when the AIRE ranking and the "piracy" vocabulary ranking using the identification of irrelevant words are combined, as illustrated by the third set of bar graphs.

The fourth set of bar graphs is based upon a combined ranking of the AIRE ranking and the "maritime" vocabulary ranking as provided in columns 60, 64 in FIG. 10. Here, there is a greater increase in the number of relevant documents in the re-ranked documents A further increase in the number of relevant documents in the re-ranked documents is based upon just the "maritime" vocabulary as provided in columns 60, 66 in FIG. 11. In the 5 top ranked documents there were 5 relevant documents; in the 10 top ranked documents there were 10 relevant documents; in the 15 and 20 top ranked documents there were 12 relevant documents for each; and in the 30 top ranked documents there were 13 relevant documents.

Figure 12:
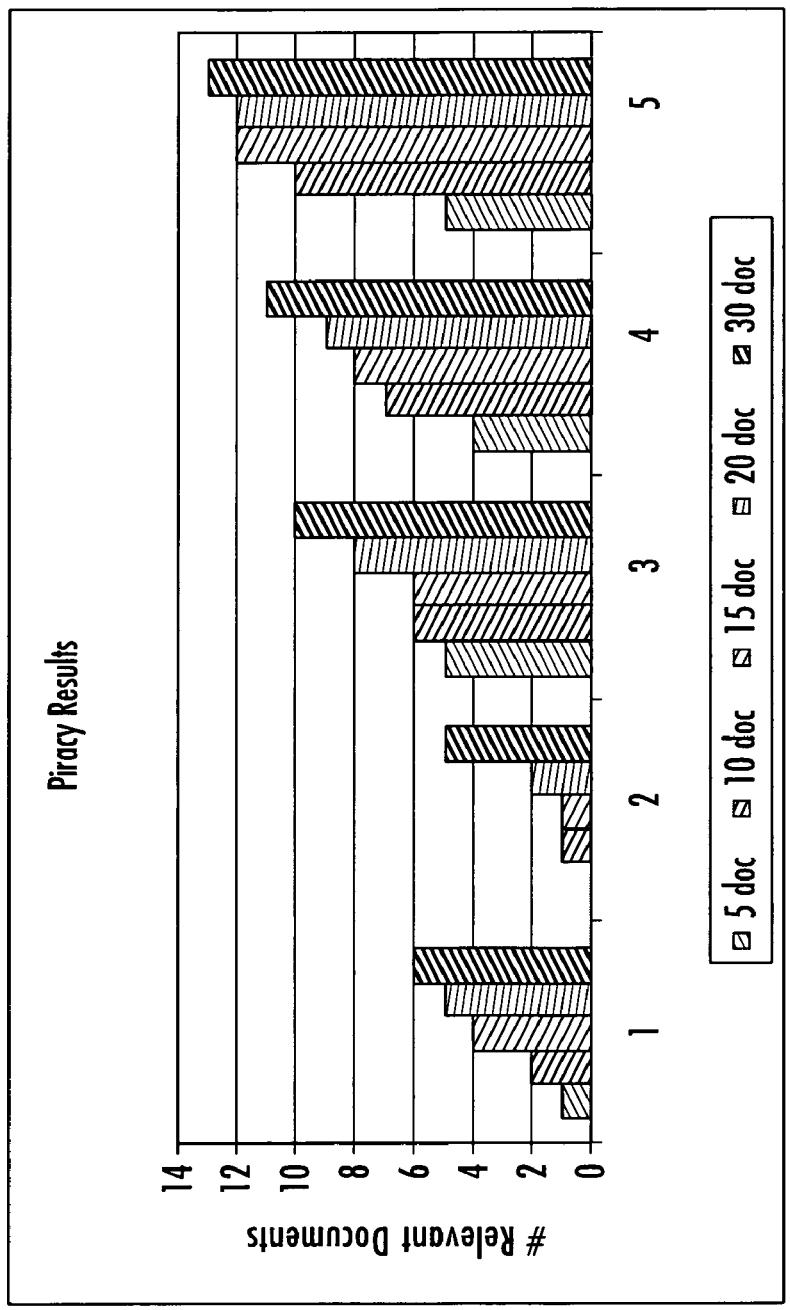
FIG. 12 is bar graph illustrating the number of relevant documents in the retrieved documents provided by different ranking parameters in accordance with the present invention.
Figure 13:
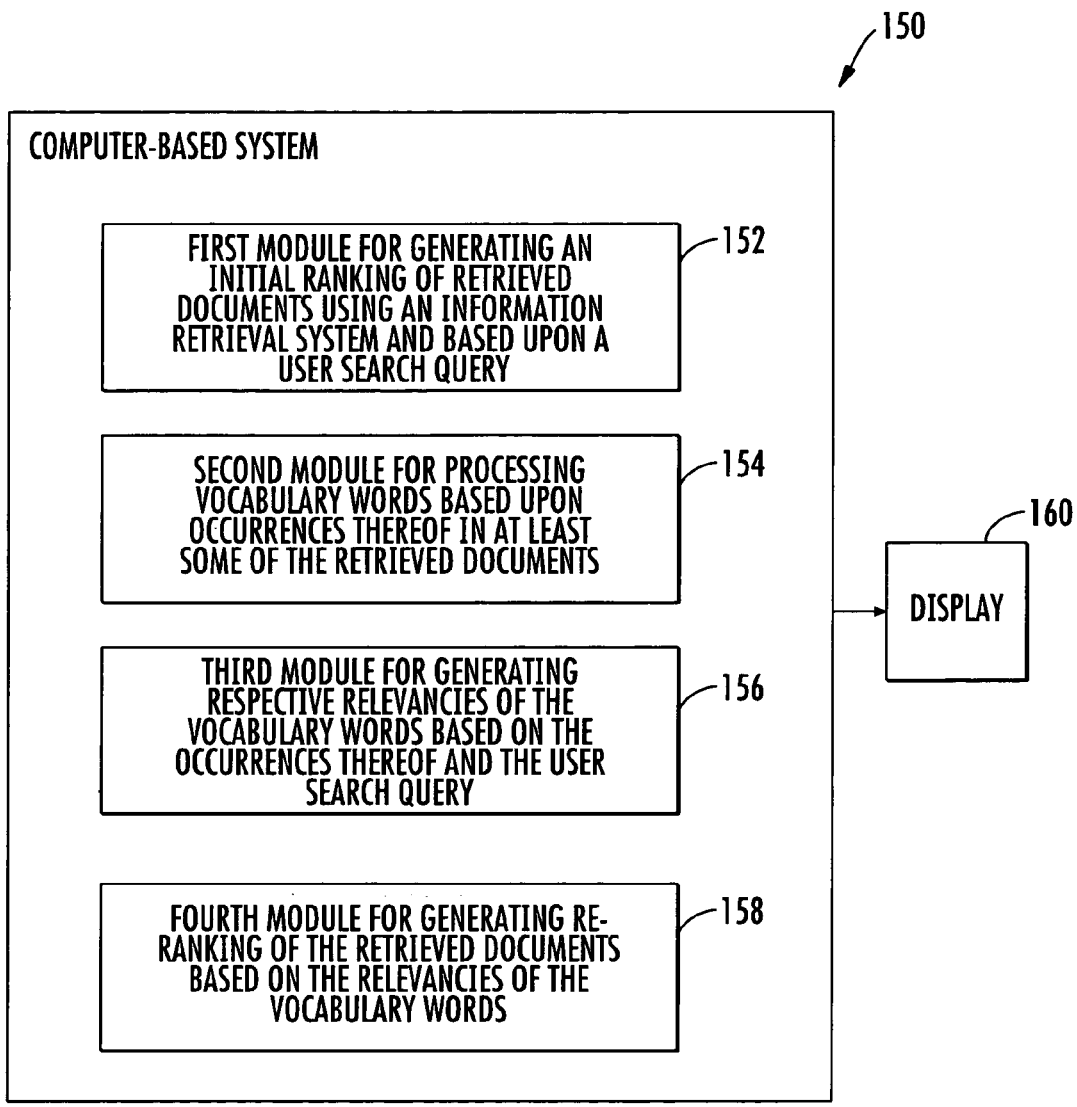
FIG. 13 is a block diagram of a computer-based system for processing documents in a document database in accordance with the present invention

As best illustrated in FIG. 12, the present invention advantageously allows the user to re-rank the retrieved documents from a document database so that more of the top ranked documents are relevant documents. A vocabulary is built based upon the user search query, or an existing vocabulary is selected. A newly created vocabulary is analyzed to identify the importance of specific words and to also identify problem words. Relevant/irrelevant words are identified through the user search query, applicable algorithms and via user input. In addition, based upon the relevancy of the words, relevant/irrelevant documents are identified. The irrelevant documents are moved to the bottom of the ranking The method may be implemented in a computer-based system 150 for processing documents in a document database, as illustrated in FIG. 13. The computer-based system 150 comprises a plurality of first through fourth modules 152-158. The first module 152 generates an initial ranking of retrieved documents using an information retrieval system and based upon a user search query. The second module 154 generating a plurality of vocabulary words based upon occurrences thereof in at least some of the retrieved documents. The third module 156 generates respective relevancies of the vocabulary words based on the occurrences thereof and the user search query. The fourth module 158 generates a re-ranking of the retrieved documents based on the relevancies of the vocabulary words. A display 160 is connected to the computer-based system 150 for displaying the re-ranked documents.

Figure 14:
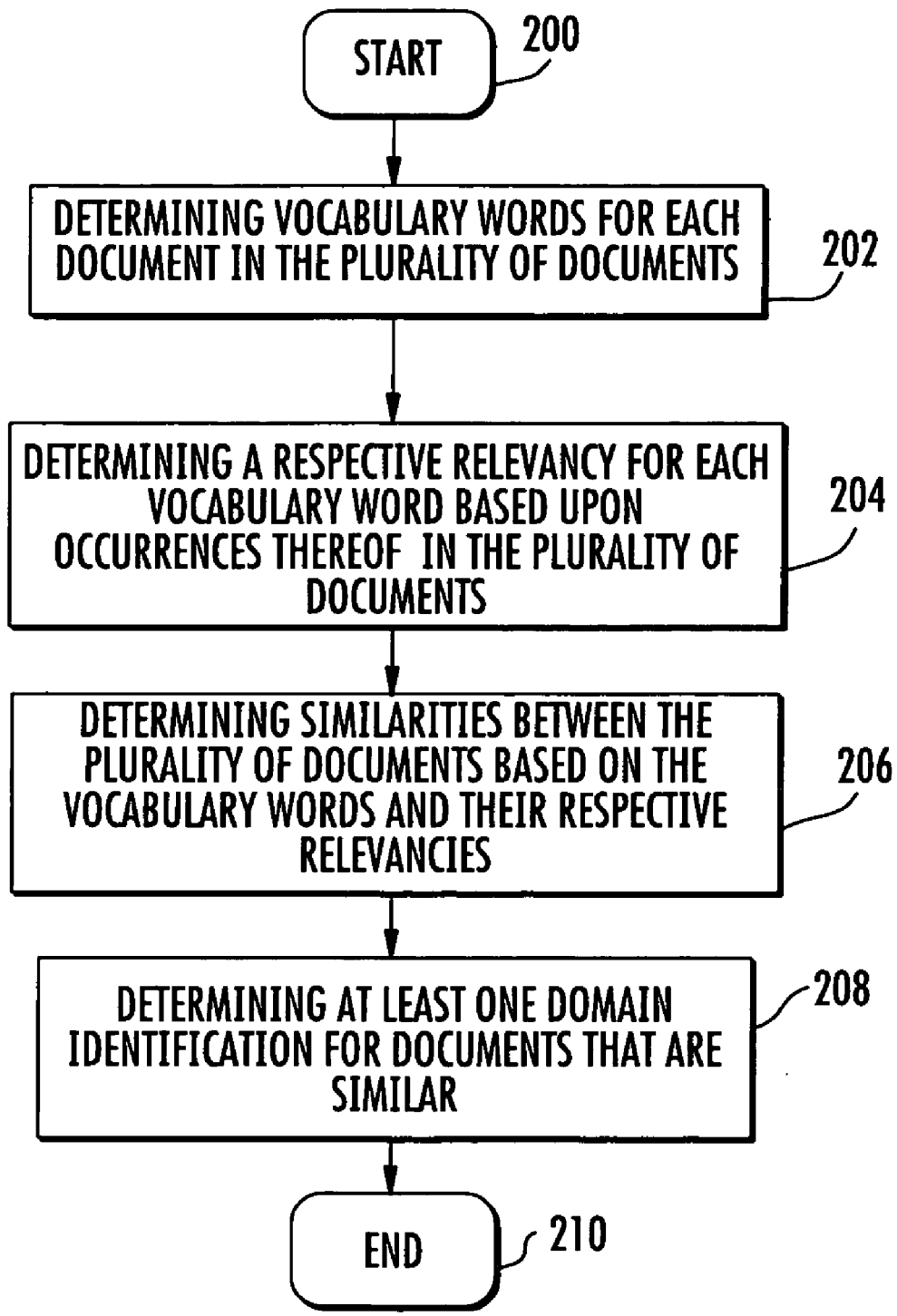
FIG. 14 is a flowchart for categorizing documents in a document database in accordance with the present invention.

Another aspect of the present invention is directed to a method for assisting a user in categorizing documents in a document database. The documents may be the result of an information retrieval system operating in response to a user search query. Alternatively, the documents are collected in response to monitoring selected web site documents, monitoring conversations (i.e., audio files), e-mail messages, and news group transactions, for example. Regardless of how the documents are provided to the user, they form the document database Referring to FIG. 14, a method for determining domain identifications for a plurality of documents in a document database will now be discussed. From the start (Block 200), vocabulary words are determined for each document at Block 202.

The vocabulary words for each document can be determined in a number of ways. One approach is to simply use all of the words in each document. Another approach is to use a word extractor for selecting words with particular meanings.

Yet another approach is to build the vocabulary on the fly. For example, N documents from a list M of documents are selected, where M≧N. The N documents form the document database. Alternatively, the vocabulary is built from specific documents. For example, the user identifies a list of relevant documents. The list of relevant documents is given to the above-described computer-implemented method for processing documents for building a vocabulary from the list of documents. As the user identifies relevant documents, they add the words of the document to the vocabulary. Building the vocabulary from specific documents provides better document rankings as compared to building the vocabulary on-the-fly.

Once the vocabulary words are determined for each document, a respective relevancy is determined for each vocabulary word based upon occurrences thereof in the plurality of documents at Block 204.

As noted above, the respective relevancies of the vocabulary words may be determined based on statistics. For example, relevancy of a vocabulary word may be based on how many times each vocabulary word is used in the plurality of documents, and how many of the plurality of documents uses each of the vocabulary words. Another statistic is based upon generating a word/document ratio for each respective vocabulary word based upon the counting, and if the word/document ratio is less than a threshold, then the relevancy of the word is not used when determining similarities between the plurality of documents.

Yet another approach for determining relevancy of a particular vocabulary word is determined by the user. Alternatively, a relevancy feedback factor is determined, and the respective relevancy of each vocabulary word may be further based upon this relevancy feedback factor. The relevancy feedback factor may be based upon a user search query or based upon an algorithm, for example.

Similarities are determined at Block 206 between the plurality of documents based on the vocabulary words and their respective relevancies. In one approach, this involves selecting at least a portion of the vocabulary words based on their respective relevancies for defining a superset of vocabulary words, with the superset of vocabulary words better illustrating similarities between the documents. In other words, the top X words (in terms of relevance) from the documents in the document database are selected to define the superset of vocabulary words. For example, X is equal to 100.

The similarities may be based on identifying single words with a high degree of relevance within the top 100 words. In addition, the similarities may be based on patterns of words in the top 100 vocabulary words. A pattern of word includes n-word phrases, where n≧2. "New York City" is a 3-word phase, for example.

At least one domain identification for documents that are similar is determined at Block 208. A number of approaches may be used for determining domain identification. One approach is for the domain identification to be determined by the user. Another approach is for the domain identification to be determined by a computer based upon overlapping vocabulary words Another approach for determining domain identification is to determine vocabulary words corresponding to a predetermined domain identification, and then determine similarities between the vocabulary words (top 100 words, for example) for the documents and the vocabulary words corresponding to the predetermined domain identification. The predetermined domain identification is assigned to the documents that have vocabulary words similar to the vocabulary words corresponding to the predetermined domain identification. The vocabulary words corresponding to the predetermined domain identification may be user defined, for example, or they may be predetermined. The method ends at Block 210.

For illustrative purposes, an example document database may be formed based upon user search queries directed to "cancer." The collected documents are from different cancer queries. Once the documents have been collected, vocabulary words from each of the collected documents are determined. Also, a respective relevancy of each vocabulary word is determined based upon occurrences thereof in the collection of documents. After the vocabulary words have been determined along with their respective relevancies, the top words are used to define a superset of vocabulary words directed to "cancer," as shown by the screens provided in FIGS. 15 and 16.

The top words may be limited to 100 words, for example, describing cancer. In other words, a cancer vocabulary made up of selected documents is defined. The importance of each vocabulary word is also provided by the screens in FIGS. 15 and 16.

The screens in FIGS. 15 and 16 show how the top words 181 are set in terms of relevancy. The number of times each vocabulary word 181 is used in the document is listed in column 182, and the number of documents that uses the word is listed in column 184. The word/document ratio is provided in column 186.

However, it is important to determine the relevancy of the words 181. The degree of relevancy is provided in columns 188 and 190. In column 192, an overall relevancy number between −1 and 1 is determined. A threshold may be set for determining relevancy. For example, words having a relevancy≧0.50 are highlighted as being relevant. Of course, the user has the option to change the threshold and to add/remove words to/from the cancer vocabulary as necessary. Words 181 having a 0 relevancy number are removed from the cancer vocabulary.

Figure 19:
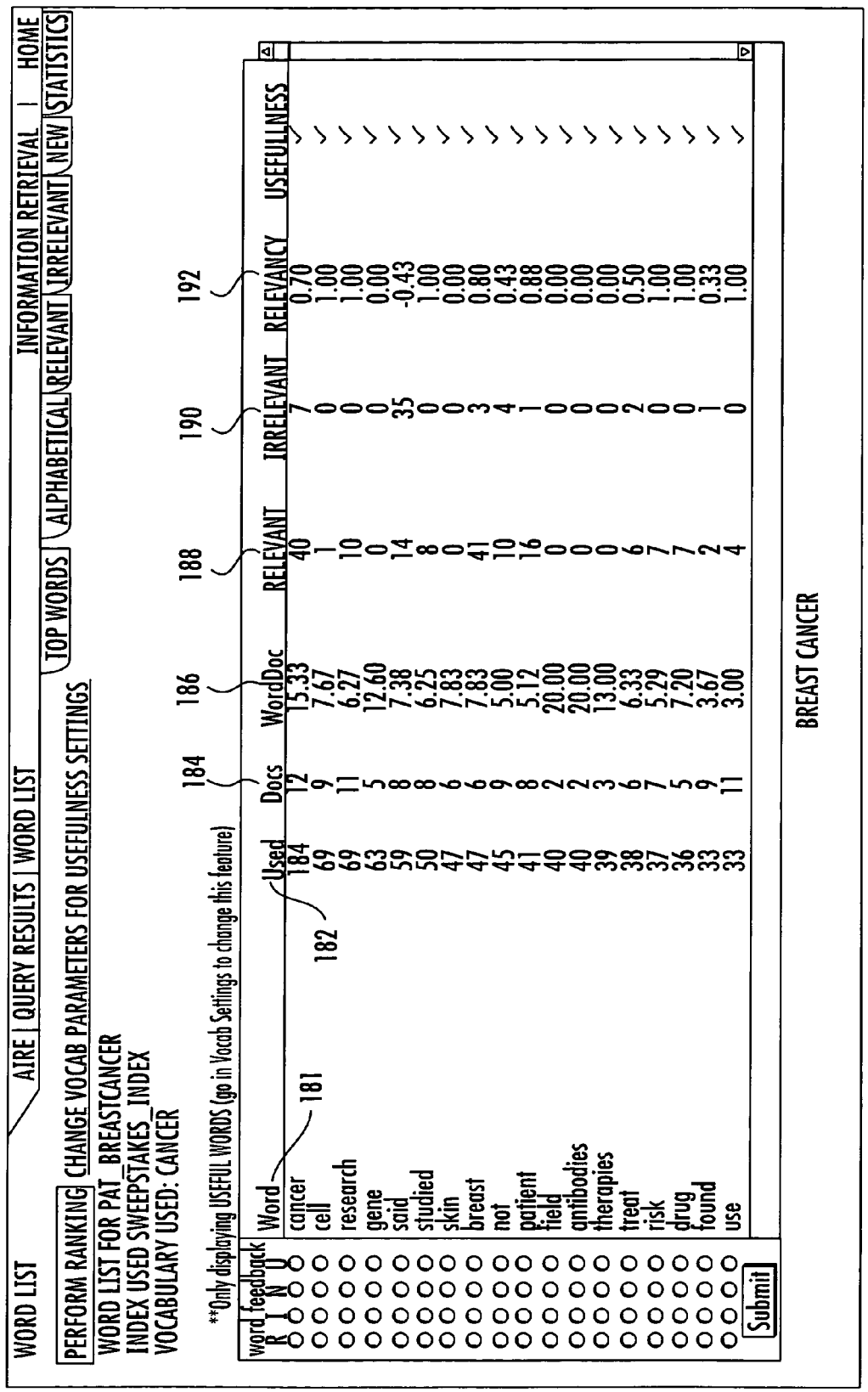

Based on the cancer vocabulary words as partially shown by the screens in FIGS. 15 and 16, documents relating to cancer may now be separated or grouped into different categories or domain identifications. Referring now to the screens provided in FIGS. 17-19, three categories have been created: skin cancer, brain cancer and breast cancer. Each of these categories is using the cancer vocabulary. The illustrated words, and consequently the documents associated with these words, are based upon a respective query of the cancer vocabulary for each of these categories. As a result of the respective queries, the word relevancy in columns 188-192 is set differently for each category. Based on the vocabulary words in the screens provided in FIGS. 17-19, the documents associated with these words are given a respective domain identification.

As noted above, the documents may comprise web site documents, electronic mail messages, and non-text documents having metadata associated therewith. The non-text documents comprise video image files, photograph files, and audio files. For example, news articles collected by a newspaper over a selected period of time may be categorized. However, many of the articles may be pictures only. The metadata associated with the pictures may be used to provide the necessary vocabulary words for domain identification. Similarly, metadata associated with video may be used to provide the necessary vocabulary words for domain identification. The photograph files may be in a JPEG formant, whereas the video image files may be in an MPEG format, for example. Audio files may be in the following formats, for example: Microsoft "wave" format (WAV), audio interchange file format (AIFF) and resource interchange file format (RIFF).

Another aspect of the invention is directed to a computer-readable medium having computer-executable instructions for causing a computer to process documents in a document database as defined above. Yet another aspect of the invention is directed to a computer-implemented system for processing documents in a document database as defined above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims That which is claimed is:

1. A method for processing a plurality of documents in a document database using a computer-implemented system comprising a processor and a display operatively coupled to the processor, the method comprising:
    operating the processor to perform the following without requiring pre-computations
        a) determining vocabulary words for each document of the plurality thereof;
        b) determining a respective relevancy for each vocabulary word based upon occurrences thereof in the plurality of documents;
        c) determining similarities and differences between the plurality of documents based upon the vocabulary words and their respective relevancies;
        d) defining supersets of vocabulary words based on the determined similarities and differences; and
        e) determining domain identifications for the supersets of vocabulary words using results of a) through d) and only after a) through d); and
    operating the display to display the defined supersets of vocabulary words and their domain identifications, including display of the vocabulary words as being relevant and irrelevant based on occurrences thereof in the plurality of documents.

2. A method according to claim 1 further comprising dividing the domain identifications into lower level domain identifications based upon selecting vocabulary words associated with each respective lower level domain identification; and wherein relevancies of vocabulary words associated with each lower level domain identification changes so that similar documents are grouped together for each lower level domain identification.

3. A method according to claim 1 wherein determining the respective relevancies of the vocabulary words comprises:
    counting how many times each vocabulary word is used in the plurality of documents; and
    counting how many of the plurality of documents uses each of the vocabulary words.

4. A method according to claim 3 further comprising generating a word/document ratio for each respective vocabulary word based upon the counting, and if the word/document ratio is less than a threshold, then the relevancy of the word is not used when determining similarities and differences between the plurality of documents.

5. A method according to claim 1 further comprising permitting user setting of the respective relevancy of at least one of the vocabulary words.

6. A method according to claim 1 further comprising determining a relevancy feedback factor; and wherein determining the respective relevancies for each vocabulary word is further based upon the user feedback factor; and wherein determining the similarities and differences is further based on the respective relevancies with respect to the feedback factor.

7. A method according to claim 6 wherein the relevancy feedback factor is based upon at least one of a user search query and an algorithm.

8. A method according to claim 1 wherein determining the similarities and differences are based on identifying patterns of words in the vocabulary words.

9. A method according to claim 8 wherein the pattern of words comprises n-word phrases, where n is greater than or equal to 2.

10. A method according to claim 1 further comprising:
    determining vocabulary words corresponding to a predetermined domain identifications;
    determining similarities and differences between the vocabulary words for the plurality of documents and the vocabulary words corresponding to the predetermined domain identifications; and
    assigning the predetermined domain identifications to the plurality of documents based on the determined similarities and differences of the vocabulary words.

11. A method according to claim 10 wherein the vocabulary words corresponding to the predetermined domain identifications are user definable.

12. A method according to claim 1 wherein the domain identifications are user determinable.

13. A method according to claim 1 wherein the domain identifications are determined based upon overlapping vocabulary words.

14. A method according to claim 1 wherein the plurality of documents comprises at least one web site document.

15. A method according to claim 1 wherein the plurality of documents comprises at least one electronic mail message.

16. A method according to claim 1 wherein the plurality of documents comprises at least one non-text document having metadata associated therewith.

17. A method according to claim 16 wherein the at least one non-text documents comprises at least one of a video image file, a photograph file, and an audio file.

18. A method for processing a plurality of documents in a document database using a computer-implemented system comprising a processor and a display coupled to the processor, the method comprising:
    operating the processor to perform the following without requiring pre-computations
        a) determining vocabulary words for each document of the plurality thereof;
        b) determining a respective relevancy for each vocabulary word based upon occurrences thereof in the plurality of documents using a computer;
        c) determining similarities and differences between the plurality of documents based upon the vocabulary words and their respective relevancies;
        d) defining supersets of vocabulary words based on the determined similarities and differences;
        e) determining domain identifications for the supersets of vocabulary words based upon the determined similarities and differences using results of a) through d) and only after a) through d); and
        dividing the domain identifications into lower level domain identifications based upon selecting vocabulary words associated with each respective lower level domain identification, with relevancies of vocabulary words associated with each lower level domain identification changing so that similar documents are grouped together for each lower level domain identification; and operating the display to display the defined supersets of vocabulary words and their domain identifications including the lower level domain identifications, including display of the vocabulary words as being relevant and irrelevant based on occurrences thereof in the plurality of documents.

19. A method according to claim 18 wherein determining the respective relevancies of the vocabulary words comprises:
counting how many times each vocabulary word is used in the plurality of documents; and
counting how many of the plurality of documents uses each of the vocabulary words.

20. A method according to claim 19 further comprising generating a word/document ratio for each respective vocabulary word based upon the counting, and if the word/document ratio is less than a threshold, then the relevancy of the word is not used when determining similarities and differences between the plurality of documents.

21. A method according to claim 20 wherein determining the similarities and differences are based on identifying patterns of words in the vocabulary words.

22. A method according to claim 18 further comprising:
determining vocabulary words corresponding to predetermined domain identifications;
determining similarities and differences between the vocabulary words for the plurality of documents and the vocabulary words corresponding to the predetermined domain identifications; and
assigning the predetermined domain identifications to the plurality of documents based on the determined similarities and differences of the vocabulary words.

23. A method according to claim 18 wherein the plurality of documents comprises at least one of a web site document, an electronic mail message, and a non-text document having metadata associated therewith.

24. A computer-readable storage medium having computer-executable instructions stored thereon for causing a computer-implemented system comprising a processor and a display coupled to the processor to perform steps comprising:
operating the processor to perform the following without requiring pre-computations
a) determining vocabulary words for each document of the plurality thereof;
b) determining a respective relevancy for each vocabulary word based upon occurrences thereof in the plurality of documents;
c) determining similarities and differences between the plurality of documents based upon the vocabulary words and their respective relevancies;
d) defining supersets of vocabulary words based on the determined similarities and differences; and
e) determining domain identifications for the supersets of vocabulary words using results of a) through d) and only after a) through d); and
operating the display to display the defined supersets of vocabulary words and their domain identifications, including display of the vocabulary words as being relevant and irrelevant based on occurrences thereof in the plurality of documents.

25. A computer-readable medium according to claim 24 further comprising dividing the domain identifications into lower level domain identifications based upon selecting vocabulary words associated with each respective lower level domain identification; and wherein relevancies of vocabulary words associated with each lower level domain identification changes so that similar documents are grouped together for each lower level domain identification.

26. A computer-readable medium according to claim 24 wherein determining the respective relevancies of the vocabulary words comprises:
counting how many times each vocabulary word is used in the plurality of documents; and
counting how many of the plurality of documents uses each of the vocabulary words.

27. A computer-readable medium according to claim 26 further comprising generating a word/document ratio for each respective vocabulary word based upon the counting, and if the word/document ratio is less than a threshold, then the relevancy of the word is not used when determining similarities and differences between the plurality of documents.

28. A computer-readable medium according to claim 24 wherein determining the similarities and differences are based on identifying patterns of words in the vocabulary words.

29. A computer-readable medium according to claim 24 further comprising:
determining vocabulary words corresponding to predetermined domain identifications;
determining similarities and differences between the vocabulary words for the plurality of documents and the vocabulary words corresponding to the predetermined domain identifications; and
assigning the predetermined domain identifications to the plurality of documents based on the determined similarities and differences of the vocabulary words.

30. A computer-readable medium according to claim 24 wherein the plurality of documents comprises at least one of a web site document, an electronic mail message and non-text document having metadata associated therewith.

31. A computer-implemented system comprising:
a processor for processing documents in a document database, said processor configured to perform the following without requiring pre-computations
a) determining vocabulary words for each document of the plurality thereof;
b) determining a respective relevancy for each vocabulary word based upon occurrences thereof in the plurality of documents;
c) determining similarities and differences between the plurality of documents based upon the vocabulary words and their respective relevancies;
d) defining supersets of vocabulary words based on the determined similarities and differences; and
e) determining domain identifications for the supersets of vocabulary words based upon the determined similarities and differences using results of a) through d) and only after a) through d); and
a display coupled to said processor for displaying the defined supersets of vocabulary words and their domain identifications, including display of the vocabulary words as being relevant and irrelevant based on occurrences thereof in the plurality of documents.

32. A computer-implemented system according to claim 31 wherein said processor is further configured for dividing the domain identifications into lower level domain identifications based upon selecting vocabulary words associated with each respective lower level domain identification; and wherein relevancies of vocabulary words associated with each lower level domain identification changes so that similar documents are grouped together for each lower level domain identification.

33. A computer-implemented system according to claim 31 wherein determining the respective relevancies of the vocabulary words comprises:
   counting how many times each vocabulary word is used in the plurality of documents; and
   counting how many of the plurality of documents uses each of the vocabulary words.

34. A computer-implemented system according to claim 33 wherein said processor is further configured for generating a word/document ratio for each respective vocabulary word based upon the counting, and if the word/document ratio is less than a threshold, then the relevancy of the word is not used when determining similarities and differences between the plurality of documents.

35. A computer-implemented system according to claim 31 wherein determining the similarities and differences are based on identifying patterns of words in the vocabulary words.

36. A computer-implemented system according to claim 31 wherein said processor is further configured for:
   determining vocabulary words corresponding to predetermined domain identifications;
   determining similarities and differences between the vocabulary words for the plurality of documents and the vocabulary words corresponding to the predetermined domain identifications; and
   assigning the predetermined domain identifications to the plurality of documents based on the determined similarities and differences of the vocabulary words.

37. A computer-implemented system according to claim 31 wherein the plurality of documents comprises at least one of a web site document, an electronic mail message and non-text document having metadata associated therewith.

* * * * *